United States Patent
Ihara et al.

(10) Patent No.: US 12,536,078 B2
(45) Date of Patent: Jan. 27, 2026

(54) STORAGE SYSTEM WITH STORAGE CONTROLLERS TO CONTROL DATA INPUT AND OUTPUT BETWEEN A HOST APPARATUS AND A STORAGE DRIVE IN NORMAL AND DEGRADED OPERATION STATES

(71) Applicant: Hitachi, Ltd., Tokyo (JP)

(72) Inventors: Hiroka Ihara, Tokyo (JP); Sadahiro Sugimoto, Tokyo (JP); Tomohiro Yoshihara, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 91 days.

(21) Appl. No.: 18/602,479

(22) Filed: Mar. 12, 2024

(65) Prior Publication Data

US 2024/0403167 A1 Dec. 5, 2024

(30) Foreign Application Priority Data

May 31, 2023 (JP) ................................ 2023-090000

(51) Int. Cl.
*G06F 11/00* (2006.01)
*G06F 1/3287* (2019.01)
(Continued)

(52) U.S. Cl.
CPC ........ *G06F 11/2089* (2013.01); *G06F 1/3287* (2013.01); *G06F 3/0625* (2013.01); *G06F 3/0647* (2013.01); *G06F 11/2097* (2013.01)

(58) Field of Classification Search
CPC .... G06F 1/3234; G06F 1/3287; G06F 3/0625; G06F 3/0647; G06F 11/2089; G06F 11/2097

See application file for complete search history.

(56) References Cited

U.S. PATENT DOCUMENTS

| 8,145,932 B2 * | 3/2012 | Dawkins | G06F 1/3221 |
| | | | 714/6.21 |
| 8,448,004 B2 * | 5/2013 | Kalman | G06F 3/0625 |
| | | | 713/323 |

(Continued)

FOREIGN PATENT DOCUMENTS

| JP | 2008-40612 A | 2/2008 |
| JP | 2015-172863 A | 10/2015 |

(Continued)

OTHER PUBLICATIONS

Japanese Office Action received in corresponding Japanese Application No. 2023-090000 dated Jun. 3, 2025.

*Primary Examiner* — Marc Duncan
(74) *Attorney, Agent, or Firm* — MATTINGLY & MALUR, PC

(57) ABSTRACT

Storage controllers shift from a normal operation mode to a degraded operation mode in accordance with a command from a management apparatus. Each of the storage controllers in the normal operation mode works in the normal operation state. In transition from the normal operation mode to the degraded operation mode in accordance with a command from the management apparatus, a storage controller designated by the management apparatus changes from the normal operation state into the standing-by state and the other storage controllers except for the designated storage controller change from the normal operation state into the degraded operation state. The storage controller in the standing-by state changes into the degraded operation state in response to stop of a storage controller in the degraded operation state because of occurrence of a failure under the degraded operation mode.

9 Claims, 18 Drawing Sheets

(51) Int. Cl.
*G06F 3/06* (2006.01)
*G06F 11/20* (2006.01)

(56) References Cited

U.S. PATENT DOCUMENTS

| | | | | |
|---|---|---|---|---|
| 2005/0182906 A1* | 8/2005 | Chatterjee | ............ | G06F 12/0866 |
| | | | | 711/143 |
| 2007/0079063 A1* | 4/2007 | Mizuno | .................... | G06F 3/067 |
| | | | | 711/170 |
| 2009/0006876 A1* | 1/2009 | Fukatani | ................ | G06F 3/0625 |
| | | | | 713/320 |
| 2012/0137172 A1* | 5/2012 | Gardelegen | ........... | G06F 1/3287 |
| | | | | 714/14 |
| 2013/0036242 A1* | 2/2013 | Rickard | ................ | G06F 11/349 |
| | | | | 710/18 |
| 2020/0097204 A1 | 3/2020 | Sato et al. | | |
| 2021/0034250 A1 | 2/2021 | Mizuno et al. | | |

FOREIGN PATENT DOCUMENTS

| JP | 2020-47215 A | 3/2020 |
|---|---|---|
| JP | 2021-26421 A | 2/2021 |

\* cited by examiner

STORAGE SYSTEM WITH STORAGE CONTROLLERS TO CONTROL DATA INPUT AND OUTPUT BETWEEN A HOST APPARATUS AND A STORAGE DRIVE IN NORMAL AND DEGRADED OPERATION STATES

CLAIM OF PRIORITY

The present application claims priority from Japanese patent application JP 2023-090000 filed on May 31, 2023, the content of which is hereby incorporated by reference into this application.

BACKGROUND ART

This invention relates to a storage system.

Reducing the power consumption of storage systems is one of technical challenges. Especially for enterprise storage systems equipped with a controller including a CPU and a drive box including storage drives, a solution to reduce the power consumption is strongly demanded. These storage systems have importance on availability and therefore, a plurality of controllers capable of exhibiting high performance relative to the actual application load are mounted to achieve high redundancy.

Background art of this disclosure includes US 2012/0137172 A. US 2012/0137172 A discloses powering off some components of a dual-controller storage system to reduce the power consumption while reducing the reliability instead, as long as the demand for the reliability is smaller.

SUMMARY

Demanded is a technique to reduce the power consumption of a storage system equipped with a plurality of storage controllers, while securing the availability.

An aspect of this invention a storage system including a plurality of storage controllers, wherein the plurality of storage controllers shift from a normal operation mode to a degraded operation mode in accordance with a command from a management apparatus, wherein each of the plurality of storage controllers changes from state to state among a plurality of states, wherein the plurality of states include: a normal operation state in which the storage controller controls data input and output between one or more host apparatuses and one or more storage drives under the normal operation mode; a degraded operation state in which the storage controller controls data input and output between one or more host apparatuses and one or more storage drives under the degraded operation mode; and a standing-by state in which the storage controller stops data input and output between a host apparatus and a storage drive, consuming less power than in the normal operation state or the degraded operation state, wherein each of the plurality of storage controllers in the normal operation mode works in the normal operation state, wherein, in transition from the normal operation mode to the degraded operation mode in accordance with a command from the management apparatus, a storage controller designated by the management apparatus out of the plurality of storage controllers changes from the normal operation state into the standing-by state and the other storage controllers except for the designated storage controller change from the normal operation state into the degraded operation state, and wherein the storage controller in the standing-by state changes into the degraded operation state in response to stop of a storage controller in the degraded operation state because of occurrence of a failure under the degraded operation mode.

An aspect of this invention enables reduction of power consumption of a storage system equipped with a plurality of storage controllers, while securing the availability.

DETAILED DESCRIPTION

Hereinafter, embodiments are described with drawings. The embodiments are merely examples to implement this invention and not to limit the technical scope of this invention. In addition, not all the combinations of features described in the embodiments are requisite for the solution of this invention.

In the following description, information may be expressed as, for example, "xxx table"; however, the information can be expressed in data structures other than tables. To imply the independency from the data structure, the "xxx table" can be referred to as "xxx information". Although the following description uses numerals as identification information of components, other kinds of identification information (such as names and identifiers) can be used.

The following description may use the common parts in the reference signs (or identical reference signs) for the same kind of components when they do not need to be distinguished from one another and use different reference signs (or the IDs of the components) when they need to be distinguished from one another.

A computer program is executed by a processor (for example, a central processing unit (CPU)) included in a storage controller to perform predetermined processing using storage resources (for example, a primary storage) and/or a communication interface device as appropriate and therefore, the agent of some processing can be a storage controller or a processor. The storage controller can include a hardware circuit for performing a part or all of its processing. The computer program can be installed from a program source, which can be a program distribution server or a computer-readable storage medium.

Figure 1:
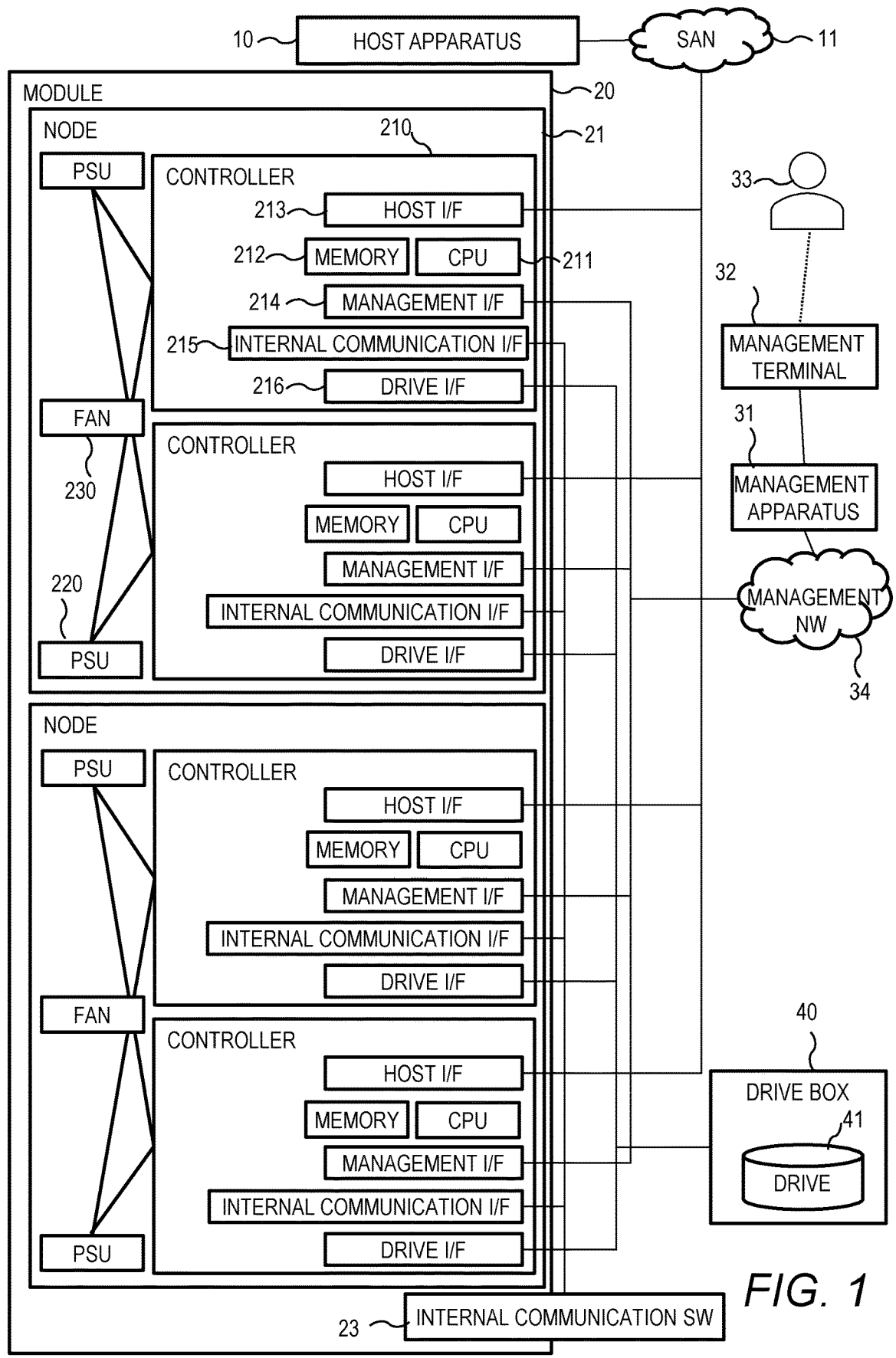
FIG. 1 is a diagram illustrating the configuration of an information system in an embodiment of this specification.

FIG. 1 is a diagram illustrating the configuration of an information system in an embodiment of this specification. The information system includes a storage system, a host apparatus 10, a management apparatus 31, and a management terminal 32. The storage system includes a module 20 and a drive box 40. The module 20 includes a plurality of nodes 21; the number of nodes 21 included in one module 20 in the configuration example in FIG. 1 is two.

Each node 21 includes a plurality of controllers (also referred to as storage controllers) 210; the number of controllers 210 included in one node 21 in the configuration example in FIG. 1 is two. In FIG. 1, one node is provided with a reference sign 21 and one controller is provided with a reference sign 210 by way of example.

Each node 21 further includes one or more power supply units (PSUs) 220 and one or more cooling fans 230. The PSUs and the cooling fans are stoppable components shared by the controllers in the node. The node 21 in the example in FIG. 1 includes two PSUs 220 and one fan 230. The two PSUs 220 are configured to have redundancy and each PSU 220 supplies power to the two controllers 210. In FIG. 1, one PSU is provided with a reference sign 220 by way of example. The components of each node 21 can be enclosed in one frame.

Each controller 210 controls input and output of host data between the host apparatus 10 and the drive box 40 in accordance with data input/output commands from the host apparatus 10. The controller 210 includes a CPU 211 of a processor, a memory (primary storage) 212, a host interface (I/F) 213, a management interface 214, an internal communication interface 215, and a drive interface 216. The number of components of each kind constituting the controller 210 can be one or more.

The CPU 211 is to control the controller 210 overall and operates in accordance with programs stored in the memory 212. The memory 212 can be a semiconductor memory such as a synchronous dynamic random-access memory (SDRAM). The memory 212 can be a combination of a volatile memory and a non-volatile memory such as a storage class memory (SCM).

The host interface 213 is controlled by the CPU 211 and sends and receives I/O requests and I/O data to and from the host apparatus 10 via a storage area network (SAN) 11. The host interface 213 can include a plurality of ports and communicate with a plurality of host apparatuses through the ports.

The management interface 214 is controlled by the CPU 211. It receives control commands from the management apparatus 31 and sends responses to the control commands via a management network (NW) 34. The user 33 operates the management apparatus 31 through the management terminal 32. The management terminal 32 and the management apparatus 31 can have a computer configuration including a processor, a memory, a communication interface, and input and output devices. The internal communication interface 215 is controlled by the CPU 211 and communicates data with the other controllers 210 via an internal communication switch (SW) 23.

The drive interface 216 is controlled by the CPU 211 and communicates I/O data with drives (also referred to as storage drives) in the drive box 40. The drive box 40 includes a plurality of drives (storage drives) 41 such as SSDs or HDDs within a frame and further, includes an internal switch for connecting the plurality of drives 41 to a controller 210 as well as a processor and a memory to be used for data transfer. The drives 41 receive host data from the host apparatus 10 through a controller 210 and store and hold the host data.

To secure the availability of data stored in the drive box 40, a RAID can be configured with drives 41 included in the drive box 40 or a plurality of drive boxes 40. One drive 41 can belong to one or more parity groups. Although FIG. 1 shows one drive box 40, each controller 210 can communicate with a plurality of drive boxes. The drives 41 can be an all-flash array (AFA) including non-volatile semiconductor memories and all or a part of the AFA can be replaced with hard disk drives (HDDs)

FIG. 1 is to illustrate a configuration example of a storage system; the number of nodes in a module and the number of controllers in a node can be determined depending on the design. All the controllers in the storage system do not need to be managed separately for individual nodes or modules.

Figure 2:
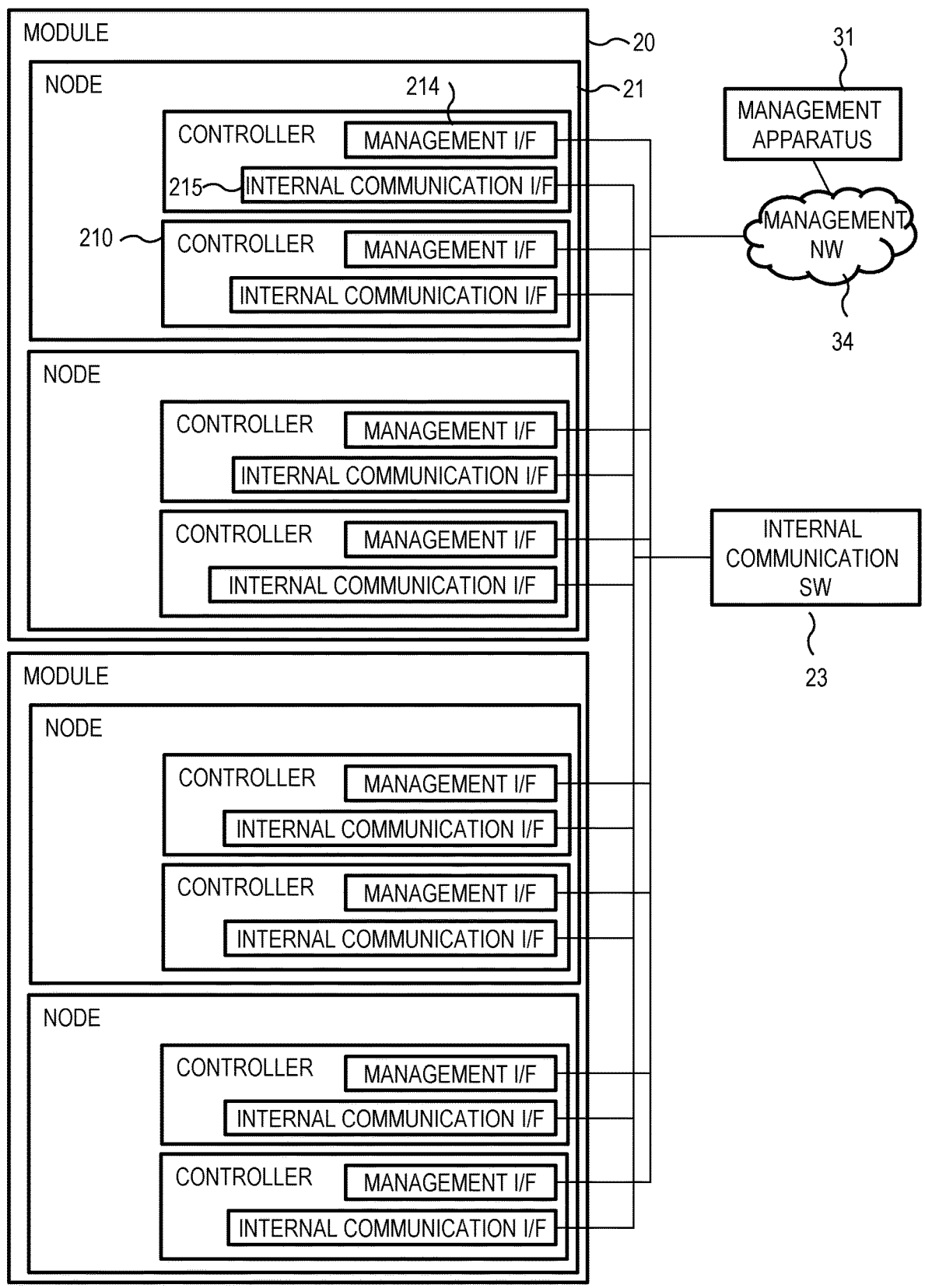
FIG. 2 illustrates a configuration example of a storage system including a plurality of modules.

FIG. 2 illustrates a configuration example of a storage system including a plurality of modules 20. Each module 20 has the configuration described with reference to FIG. 1. For simplicity of illustration, FIG. 2 does not include some of the components shown in FIG. 1. In the configuration example in FIG. 2, the number of modules 20 included in the storage system is two and the number of nodes included in each module 20 is two. All controllers 210 can communicate with one another through their internal communication interfaces 215 and the internal communication switch 23. The management apparatus 31 can communicate with all controllers 210 via the management network 34.

Figure 3:
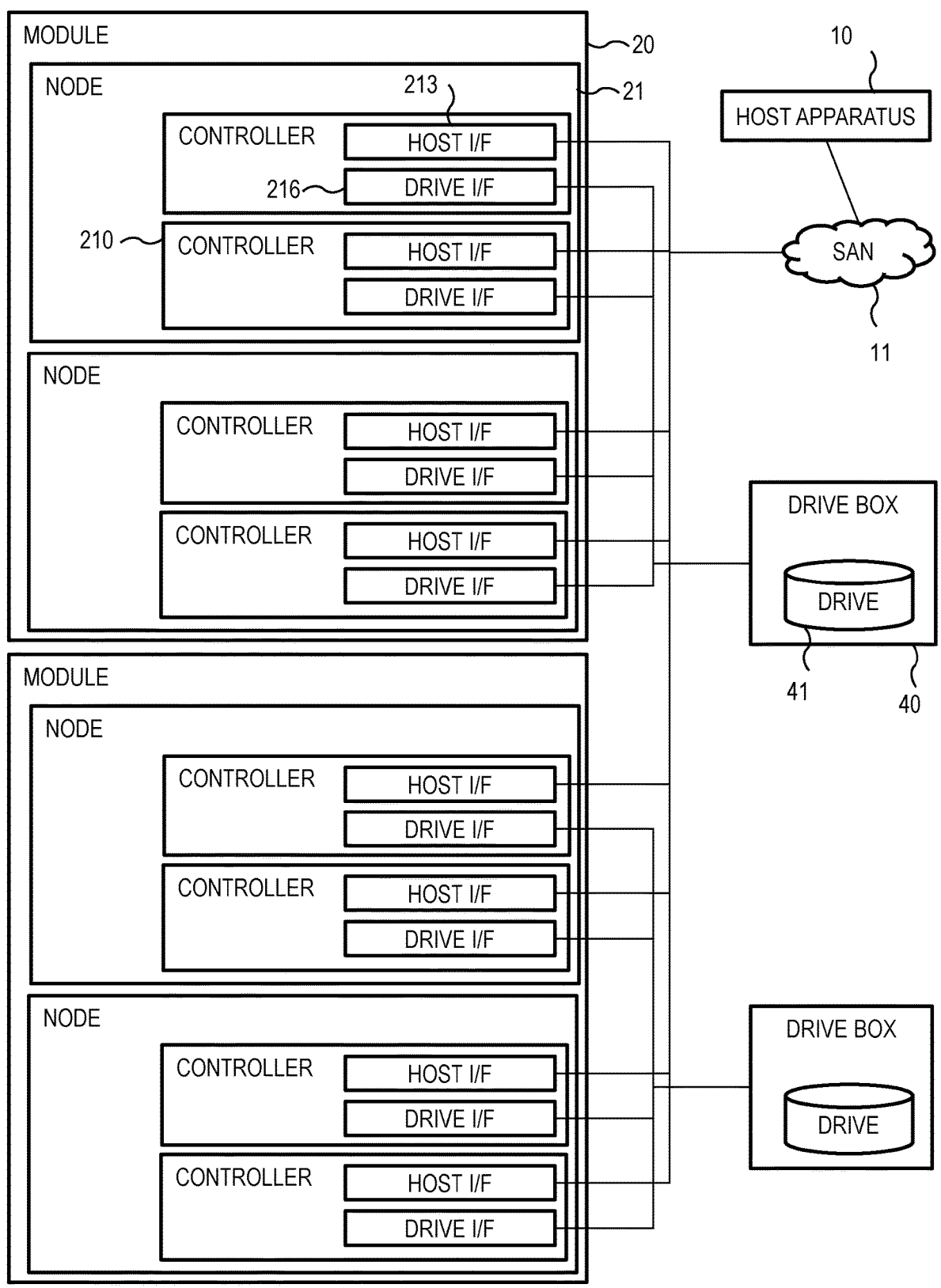
FIG. 3 illustrates other components of the storage system illustrated in FIG. 2.

FIG. 3 illustrates other components of the storage system illustrated in FIG. 2. The host apparatus 10 is able to communicate with all controllers 210 via the storage area network 11. The two modules 20 are connected with different drive boxes 40. In an embodiment of this specification, each drive box 40 is connected with only one module 20 and accessed by the only one associated module 20. Each module 20 can be connected with a plurality of drive boxes 40. One module 20 and one or more drive boxes 40 connected therewith constitute a unit of expansion or contraction of the storage system.

Hereinafter, power saving of a storage system in an embodiment of this specification is described. Since storage systems have importance on availability, a storage system may include more controllers than required for the application I/O load. An embodiment of this specification attains reduction in power consumption by not running all controllers all the time but making some of them stand by and activating them in the event of a failure. Each controller can have one or more kinds of standing-by states such as a state where the power supply to the controller is stopped and a state where the controller partially maintains its function with the power being supplied. In any of the standing-by states, the controller stops data input and output between the host apparatus and the drive box (drives) to achieve less power consumption than in the state where data input and output are performed. The standing-by state in the example described in the following is a state where the power supply to the controller is stopped.

Figure 4:
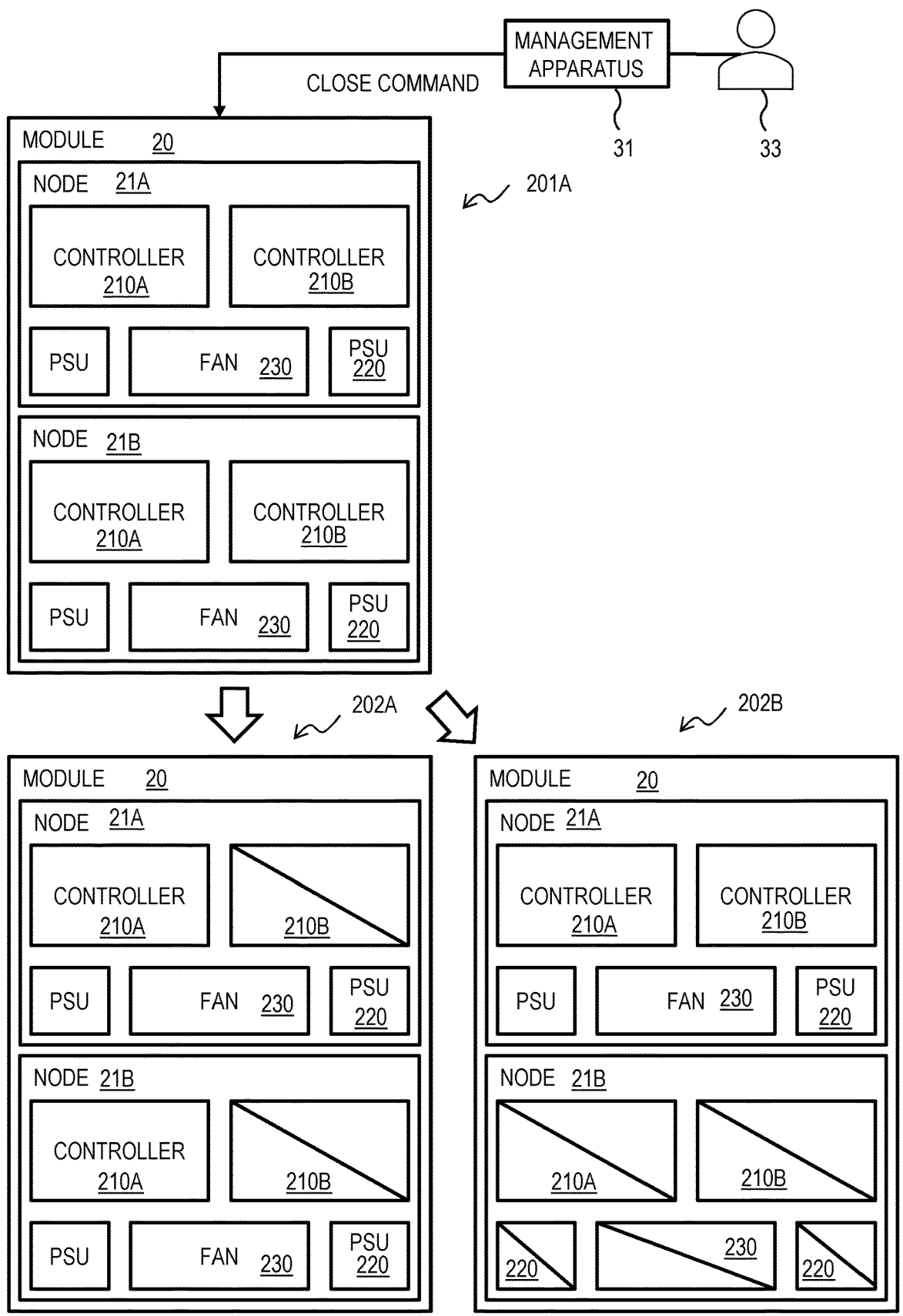
FIG. 4 schematically illustrates degraded operation modes for one module.

FIG. 4 schematically illustrates degraded operation modes for one module 20. An embodiment of this specification determines whether to use a degraded operation mode and which degraded operation mode is to be used module by module. In the example described here, each drive box 40 can be accessed by only one module 20. Controlling the degraded operation mode individually for each module 20 enables the host access to be maintained appropriately.

FIG. 4 illustrates a normal operation mode 201A where all controllers control input and output of host data, a first degraded operation mode 202A where some controllers are in a standing-by state and the other controllers control input and output of host data, and a second degraded operation mode 202B where some controllers are in a standing-by state and the other controllers control input and output of host data.

As described above, the module 20 includes two nodes: a node 21A and a node 21B. Each of the nodes 21A and 21B includes two controllers 210A and 210B, two PSUs 220, and one fan 230. The number of controllers included in one node is two.

In the normal operation mode (2N4C mode) 201A, all the four controllers in the module 20 control input and output. In similar, all the PSUs 220 and the fan 230 are in operation.

In the first degraded operation mode (2N2C mode) 202A, one controller 210A in one node 21A controls input and output and the other controller 210B is stopped (an example of the standing-by state). One controller 210A in the other node 21B controls input and output and the other controller 210B is stopped. All the PSUs 220 and the fan 230 are in operation. The first degraded operation mode 202A has higher fault tolerance than the second degraded operation mode 202B from the standpoint of redundancy.

In the second degraded operation mode (1N2C mode) 202B, one node 21A controls input and output. Specifically, all the controllers 210A and 210B in the node 21A control input and output and all the PSUs 220 and the fan 230 in the node 21A are in operation. In contrast, the node 21B is stopped. Specifically, all the controllers 210A and 210B in the node 21B are stopped and further, all the PSUs 220 and the fan 230 in the node 21B are stopped. The second degraded operation mode 202B is superior to the first degraded operation mode 202A in the point of power consumption.

The module 20 shifts from the normal operation mode 201A to the first degraded operation mode 202A or the second degraded operation mode 202B in accordance with a close command from the user 33 received through the management apparatus 31. The user 33 can select or predetermine a degraded operation mode from a plurality of degraded operation modes. As described above, the first degraded operation mode 202A is superior in availability and inferior in power consumption to the second degraded operation mode 202B. When the availability is more important than the power saving effect, the user 33 selects the first degraded operation mode 202A.

Figure 5:
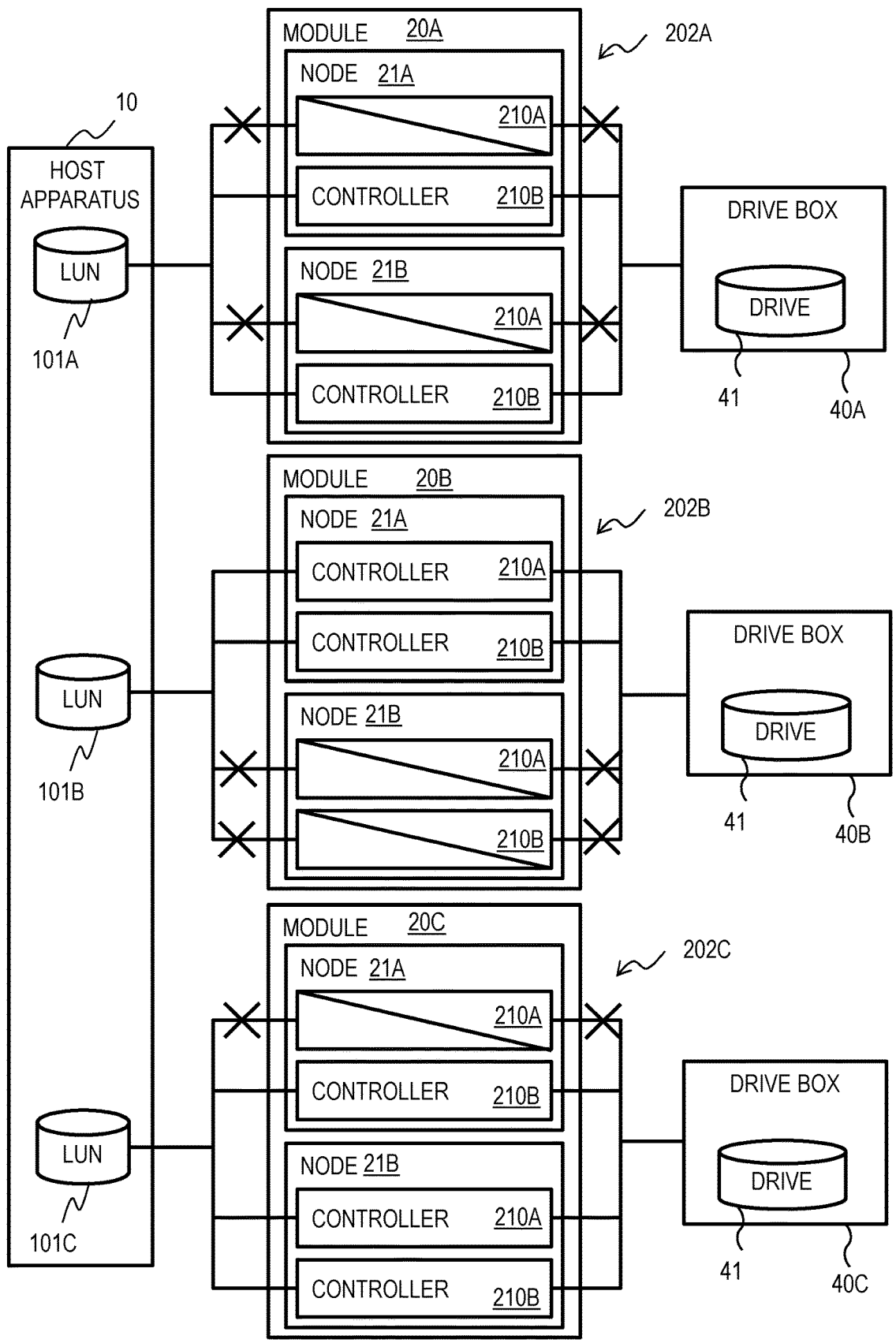
FIG. 5 illustrates paths between a host apparatus and a drive box via a module in different degraded operation modes.

FIG. 5 illustrates paths between the host apparatus 10 and a drive box 40 via a module 20 in different degraded operation modes. Each controller 210 communicates with the host apparatus 10 via a host path and communicates with a drive or a drive box via a drive path. The host path and the drive path are logical communication paths. In the example illustrated in FIG. 5, the host apparatus 10 accesses logical units 101A, 101B, and 101C to write and read host data.

The data in the logical unit 101A is physically stored in the drive box 40A. Only the module 20A controls IO from the host apparatus 10 to the drive box 40A. The module 20A is in the first degraded operation mode 202A and two controllers belonging to different nodes are in operation. Hence, the host apparatus 10 can access the logical unit 101A.

The data in the logical unit 101B is physically stored in the drive box 40B. Only the module 20B controls IO from the host apparatus 10 to the drive box 40B. The module 20B is in the second degraded operation mode 202B and two controllers belonging to the same node are in operation. Hence, the host apparatus 10 can access the logical unit 101B.

The data in the logical unit 101C is physically stored in the drive box 40C. Only the module 20C controls IO from the host apparatus 10 to the drive box 40C. The module 20C is in another degraded operation mode 202C and three controllers are in operation. Hence, the host apparatus 10 can access the logical unit 101C.

As described with reference to FIG. 5, when a module is in a degraded operation mode, at least one controller therein is in operation. As a result, a path between the host apparatus 10 and the drive box physically storing the data of a logical unit is secured. As understood from this description, even if all modules are in a degraded operation mode, all host paths between the host apparatus and the modules (combinations of controllers in operation) for the host apparatus to access each drive box through a module in the normal operation mode are present. Similarly, drive paths between the modules and the drive boxes (all drives therein) are present.

Figure 6:
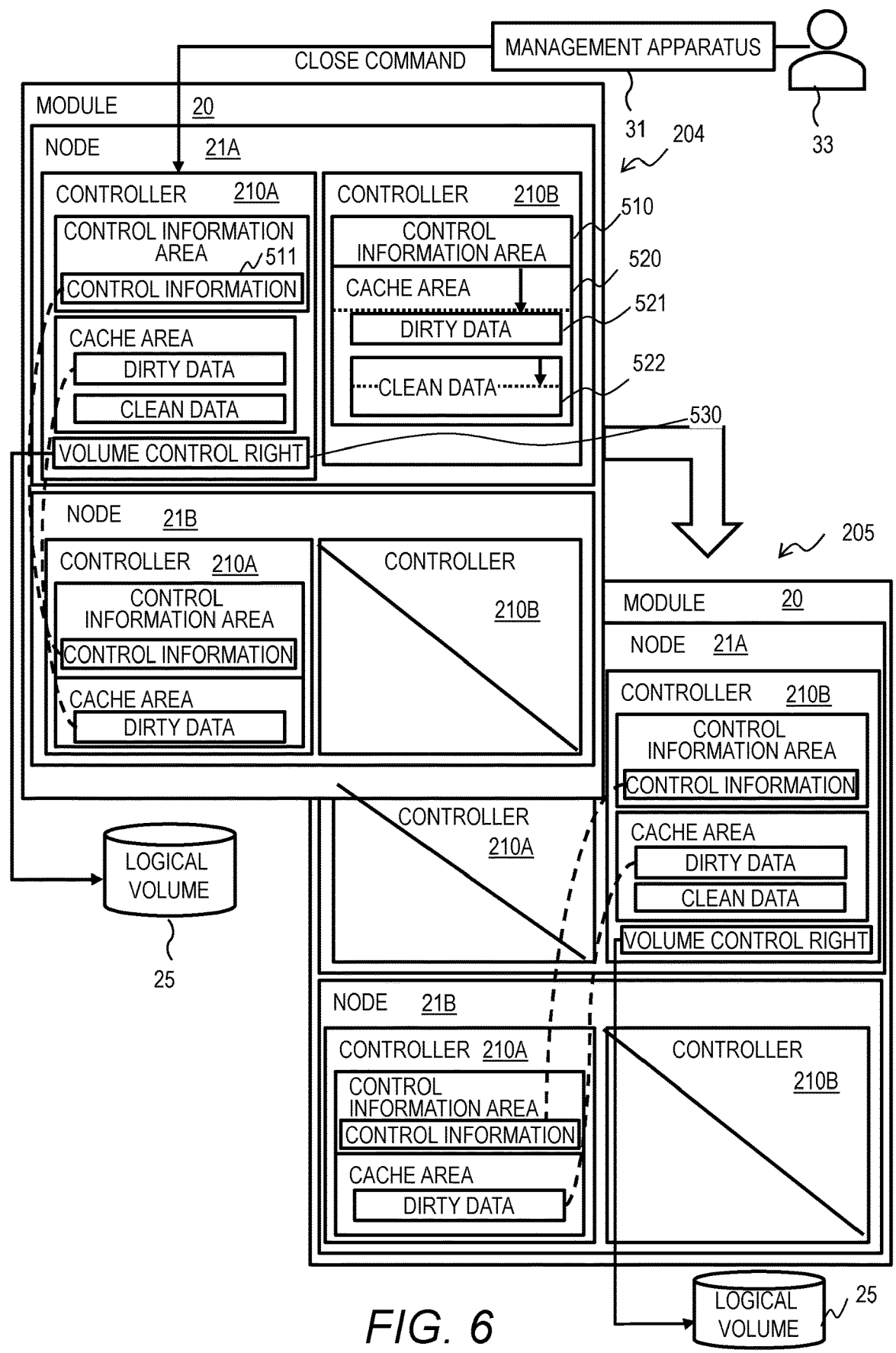
FIG. 6 illustrates an example where a module changes one controller therein from a normal operation state to a stopped state in accordance with a command from a management apparatus.

FIG. 6 illustrates an example where a module 20 changes one controller therein from a normal operation state to a stopped state in accordance with a command from the management apparatus 31. In the example in FIG. 6, the controller 210A of the node 21A changes from a normal operation state to a stopped state. Although FIG. 6 shows a close command from the management apparatus 31 to one controller 210, the command to shift to a degraded operation mode is sent to all controllers 210 that are in operation.

The module 20 changes from a state 204 to a state 205. In the state 204, one controller 210B in the node 21B is stopped and all the other controllers are in normal operation. Assume that the controller 210B in the node 21B has just changed into the stopped state. In the state 205 after the change, the controller 210A in the node 21A is stopped and the controller 210B in the node 21B is stopped. The other two controllers are in normal operation.

The memory 212 of each controller 212 includes a control information area 510 and a cache area 520. The control information area 510 is an area for storing control information to be referred to by the controller 210 to perform processing. The cache area 520 is an area for temporarily storing host data (user data) from the host apparatus 10. The cache data includes write data and can also include read data.

The cache data stored in the cache area 520 includes dirty data (dirty cache) 521 and clean data (clean cache) 522. The dirty data 521 is newer than the data at the same address in the drive box 40 and it is to update the data at the same address in the drive box 40. The clean data 522 is identical to the data at the same address in the drive box 40.

A logical volume in the storage system is exclusively accessed and controlled only by the controller (responsible controller) assigned a volume control right for the logical volume. The logical volume is a logical device in the storage system and stores host data or data to be used within the storage system. In the state 204 in FIG. 6, the controller 210A in the node 21A has a volume control right for a logical volume 25.

The control information 511 is held by one controller (a first controller) in a node. The other controller always refers to the control information 511 held by the other controller (the first controller) in the same node or has cache data of the control information 511 and refers to the cache data. Alternatively, all controllers can hold and manage identical control information.

In the state 204 in FIG. 6, the controller 210A in the node 21A holds the control information 511. The other controller 210B refers to the control information 511 in the controller 210A or holds its cache data and refers to it. Before stop of the controller 210B in the node 21B, the controller 210B had referred to the control information 511 in the controller 210A in the node 21B or had held its cache data and referred to it.

The control information 511 is made redundant with the other node 21 in the same module 20 (expressed by a dashed line in FIG. 6). In other words, controllers 210 in different nodes have the same control information 511. Update of the control information 511 in one controller 210 is reflected to the control information 511 in the other controller 210. In the state 204 in FIG. 6, the controller 210A in the node 21A and the controller 210A in the node 21B have identical control information 511.

The dirty data 521 in the cache area 520 is made redundant with the other node 21 in the same module 20 (expressed by a dashed line in FIG. 6). In other words, controllers 210 in different nodes have identical dirty data 521. Update of the dirty data 521 in one controller 210 is reflected to the dirty data 521 in the other controller 210. In the state 204 in FIG. 6, the controller 210A in the node 21A and the controller 210A in the node 21B have identical dirty data 521. Duplication of the dirty data is optional.

The controller 210A in the node 21A stops in accordance with a close command from the management apparatus 31. Before stopping, this controller 210A hands over the control information 511 and the volume control right for the logical volume 25 to the other controller 210B in the same node 21A. Furthermore, the controller 210A destages its dirty data 521 to the logical volume 25 or hands over the dirty data 521 to the controller 210B in the node 21A. In order to store the data from the controller 210A to the memory 212, the controller 210B in the node 21A prepares a free area in the memory 212 by deleting at least a part of the clean data 522, if necessary.

After the migration of the aforementioned necessary data from the controller 210A to the controller 210B within the node 21A, the controller 210A in the node 21A stops. The controller 210B in the node 21A and the controller 210A in the node 21B have the same relation as the relation between the two controllers 210A in the nodes 21A and 21B. In other words, the redundancy of the control information 511 and the dirty data 521 is maintained by these two controllers. The controller 210B in the node 21A has the volume control right 530 for the logical volume 25 and is allowed to access the logical volume 25.

The state 205 produced by the above-described processing is a state in the first degraded operation mode (2N2C mode) 202A. The state 205 has high fault tolerance because of the redundant dirty data 521 and control information 511 in the two controllers in operation. Furthermore, the access to the logical volume 25 is maintained. The redundancy of the foregoing two kinds of information is optional.

Next, a method of stopping the controller 210B in the node 21A, instead of the controller 210A in the node 21A, in the state 204 in FIG. 6 is described. Unlike the controller 210A in the same node, the controller 210B does not hold original control information 511 to be managed. Accordingly, migration of the control information 511 is unnecessary.

The volume control right 530 owned by the controller 210B is handed over to the controller 210A in the same node 21A. The dirty data 521 of the controller 210B is migrated to the controller 210A in the same node 210A or destaged to the assigned logical volume 25. As noted from this example, stopping a controller that does not hold control information 511 to be managed eliminates migration of the control information 511. Furthermore, switching the relation with the controller 210A in the other node 21B is not necessary.

The shift from the normal operation mode in which all the four controllers are in operation to the first degraded operation mode (2N2C mode) 202A can be made by selecting the controllers 210B not managing control information 511 from the nodes 21A and 21B and stopping those controllers 210B. Then, additional processing for migration of the control information 511 and synchronization of the control information 511 and the dirty data 521 can be eliminated.

The shift from the normal operation mode in which all the four controllers are in operation to the second degraded operation mode (1N2C mode) 202B can be made by closing one node. Taking an example of closing the node 21B in FIG. 6, the volume control right 530 owned by the controller 210A in the node 21B is transferred to the controller 210A in the node 21A, for example. The dirty data 521 of the controller 210A in the node 21B is destaged to the assigned logical volume 25 or migrated to the controller 210A in the node 21A. Each of the volume control right 530 and the dirty data 521 can be transferred to either controller in the node 21A.

The volume control right 530 owned by the controller 210B in the node 21B is transferred to the controller 210B in the node 21A, for example. The dirty data 521 of the controller 210B in the node 21B is destaged to the assigned logical volume 25 or migrated to the controller 210B in the node 21A. Each of the volume control right 530 and the dirty data 521 can be transferred to either controller in the node 21A.

Through the above-described processing, the volume control rights 530 are maintained by the node 21A that keeps working and the redundancy of the control information 511 is also maintained. The management apparatus 31 sends a close command to each of the controllers to be closed and the controllers that receive the command execute the closure processing (stop processing) as described above.

Figure 7:
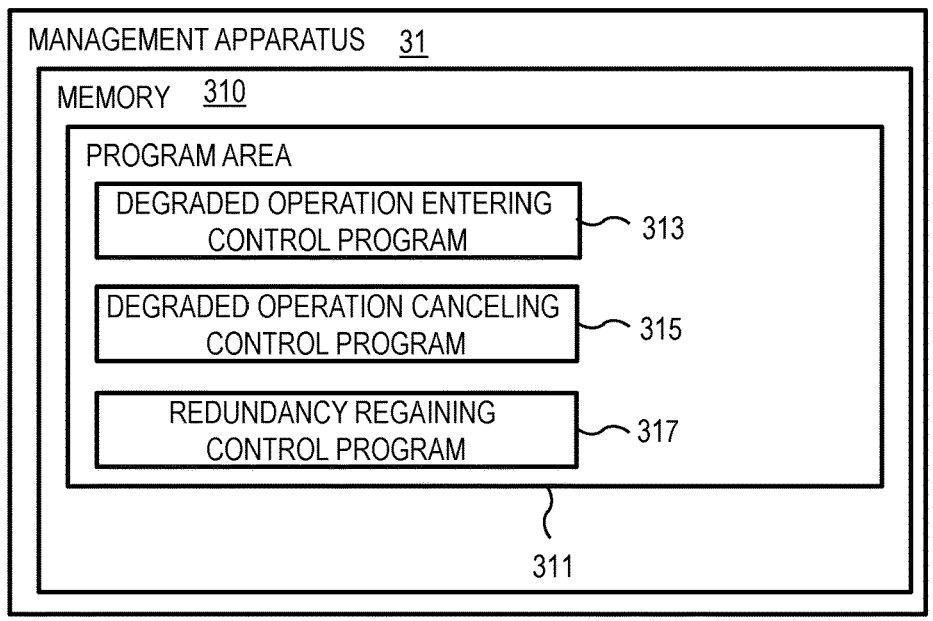
FIG. 7 illustrates programs stored in the management apparatus.

FIG. 7 illustrates programs stored in the management apparatus 31. The memory 310 of the management apparatus 31 stores a degraded operation entering control program 313, a degraded operation canceling control program 315, and a redundancy regaining control program 317 in its program area 311. The details of the processing of these programs will be described later.

Figure 8:
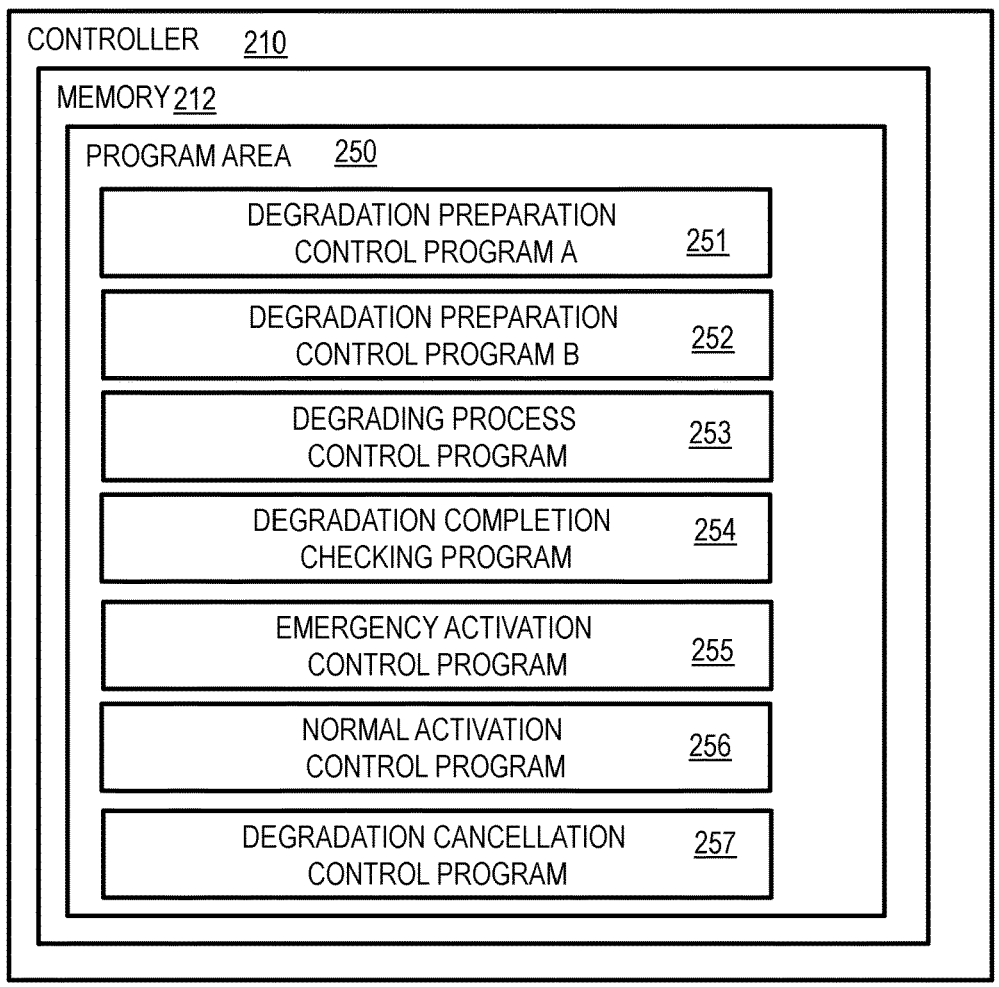
FIG. 8 illustrates programs stored in each controller.

FIG. 8 illustrates programs stored in each controller 210. The memory 212 of the controller 210 stores a degradation preparation control program A 251, a degradation preparation control program B 252, a degrading process control program 253, a degradation completion checking program 254, an emergency activation control program 255, a normal activation control program 256, and a degradation cancellation control program 257 in its program area 250. The details of the processing of these programs will be described later.

Figure 9:
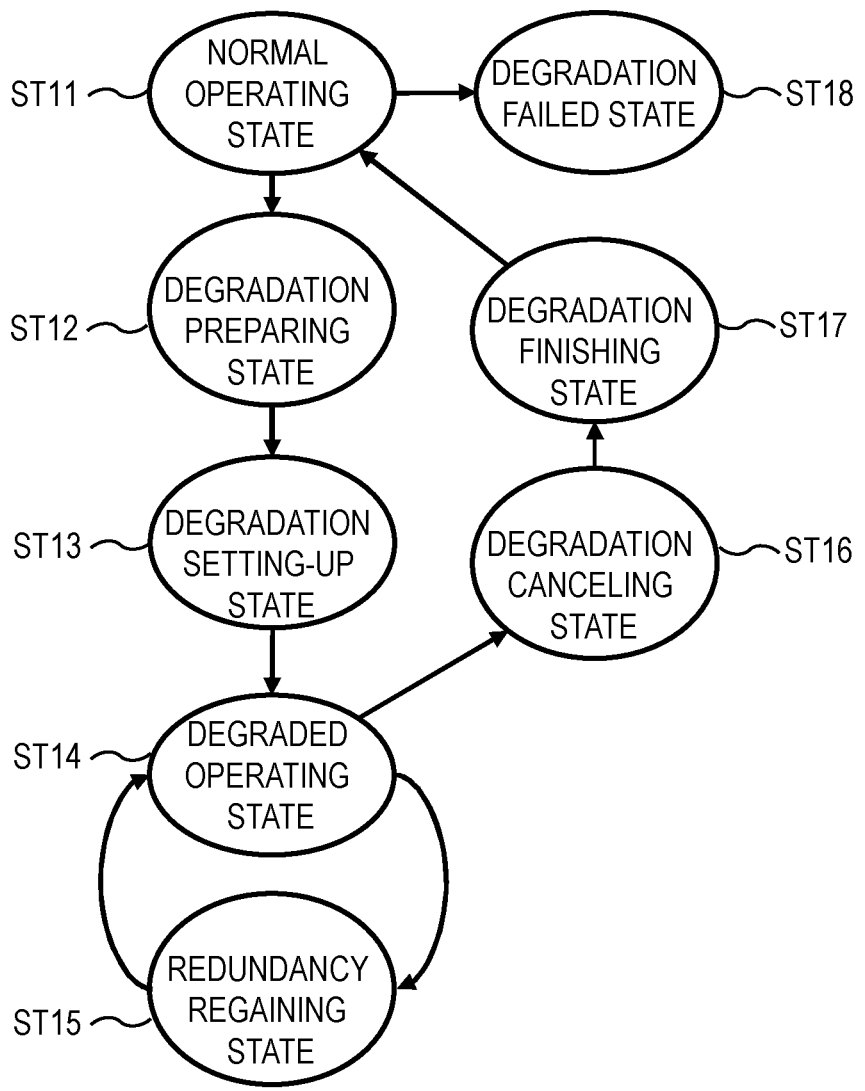
FIG. 9 illustrates state changes of a module managed by the management apparatus.

FIG. 9 illustrates state changes of a module 20 managed by the management apparatus 31. A normal operating state ST11 is a state where the module 20 is operating in the normal operation mode. In this state, all controllers therein are working. The management apparatus 31 instructs the module 20 to shift from the normal operation mode to a specific degraded operation mode. If the module 20 cannot shift to the degraded operation mode, the module state changes from the normal operating state ST11 into a degradation failed state ST18.

If the module 20 can shift to the degraded operation mode, the module state changes from the normal operating state ST11 into a degradation preparing state ST12 and further, into a degraded operating state ST14 via a degradation setting-up state ST13. In the degraded operating state ST14, the module 20 operates in the designated degraded operation mode.

If a failure occurs in one controller 210 working in the degraded operating state ST14, the module state changes into a redundancy regaining state ST15. In this state, redundancy regaining processing is performed. That is to say, one controller 210 that has been stopped is activated to have copies of the control information 511 and the dirty cache of the other working controller 210. When the redundancy is regained, the module state returns from the redundancy regaining state ST15 into a degraded operating state ST14.

As soon as the module 20 in the degraded operating state ST14 receives a command to cancel the degraded operation from the management apparatus 31, the module state changes from the degraded operating state ST14 to a degradation canceling state ST16. Thereafter, the module state changes from the degradation canceling state ST16 to the normal operating state ST11 via a degradation finishing state ST17.

Hereinafter, processing of the management apparatus 31 along with the state changes of a module illustrated in FIG. 9 is described. As described above, the management apparatus 31 executes the degraded operation entering control program 313, the degraded operation canceling control program 315, and the redundancy regaining control program 317.

Figure 10:
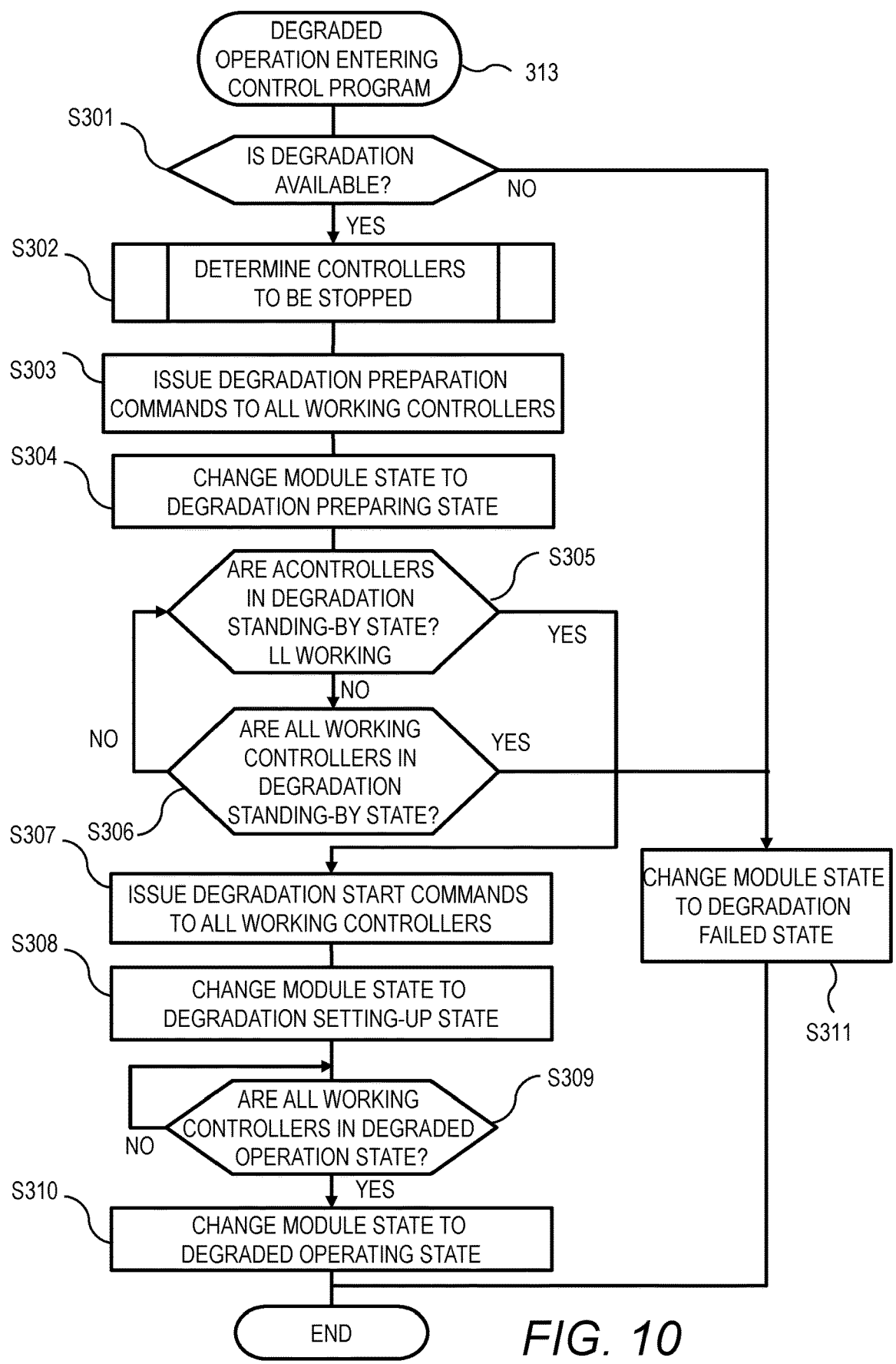
FIG. 10 is a flowchart of an example of the processing of a degraded operation entering control program in the management apparatus.

FIG. 10 is a flowchart of an example of the processing of the degraded operation entering control program 313 in the management apparatus 31. The degraded operation entering control program 313 controls and manages the state transition of a module 20 from the normal operating state ST11 to the degraded operating state ST14 as configured by the user.

First, in response to a command from the user 33 to degrade the operation of a module 20 with designation of a degraded operation mode, the degraded operation entering control program 313 determines whether the designated module 20 is able to degrade its operation (S301). For example, when the management apparatus 31 cannot communicate with the module 20 or receives a response indicating failure of degradation from some controller, the program 313 determines that the degradation is unavailable. If degradation is unavailable (S301: NO), the degraded operation entering control program 313 changes the module state in the management information held by the management apparatus 31 from normal operating state ST11 to degradation failed state ST18 (S311).

If degradation is available (S301: YES), the degraded operation entering control program 313 determines the controllers 210 to be stopped in the degraded operation mode (S302). The degraded operation entering control program 313 has information on the degraded operation mode designated by the user. As described with reference to FIGS. 4 to 6, a combination of controllers 210 to be kept working is defined for each degraded operation mode.

Next, the degraded operation entering control program 313 issues degradation preparation commands to all controllers 210 that are in operation in the module 20 (S303) and changes the module state in the management information to degradation preparing state ST12 (S304). In preparing degradation, each controller 210 going to keep working (not to stop) prepares a free area in its memory to store data including control information 511 to be migrated from a controller going to stop.

In preparing degradation, each controller 210 going to stop destages its dirty data to the drive box or migrates the dirty data to a controller 210 going to keep working. For example, the controller 210 destages the dirty data if the migration destination does not have a sufficient free area to store the dirty data and migrates the dirty data if the migration destination can secure a sufficient free area. In an example, the preparation for degradation does not include migration of control information 511. The details of the processing of each controller 210 along with the state changes of the module 20 will be described later.

The degraded operation entering control program 313 determines whether all controllers 210 in operation have changed from a degradation preparing state to a degradation standing-by state based on the notifications about state change from the controllers 210 in response to the degradation preparation commands (S305). If one or more controllers 210 cannot change into a degradation standing-by state (S305: NO and S306: YES), the degraded operation entering control program 313 changes the module state in the management information to degradation failed state ST18 (S311). If all controllers 210 in operation have changed into a degradation standing-by state (S305: YES), the degraded operation entering control program 313 issues degradation start commands to all the controllers 210 in operation (S307) and changes the module state in the management information to degradation setting-up state ST13 (S308).

Next, the degraded operation entering control program 313 determines whether each controller that should stop has stopped and all the other working controllers are in a degraded operation state based on the notifications about state change from all controllers 210 in operation (S309). If all controllers in operation have changed into a degraded operation state (S309: YES), the degraded operation entering control program 313 changes the module state in the management information to degraded operating state ST14 (S310). The degraded operation entering control program 313 can present the changes of the module state to the user 33 with a display device.

Figure 11:
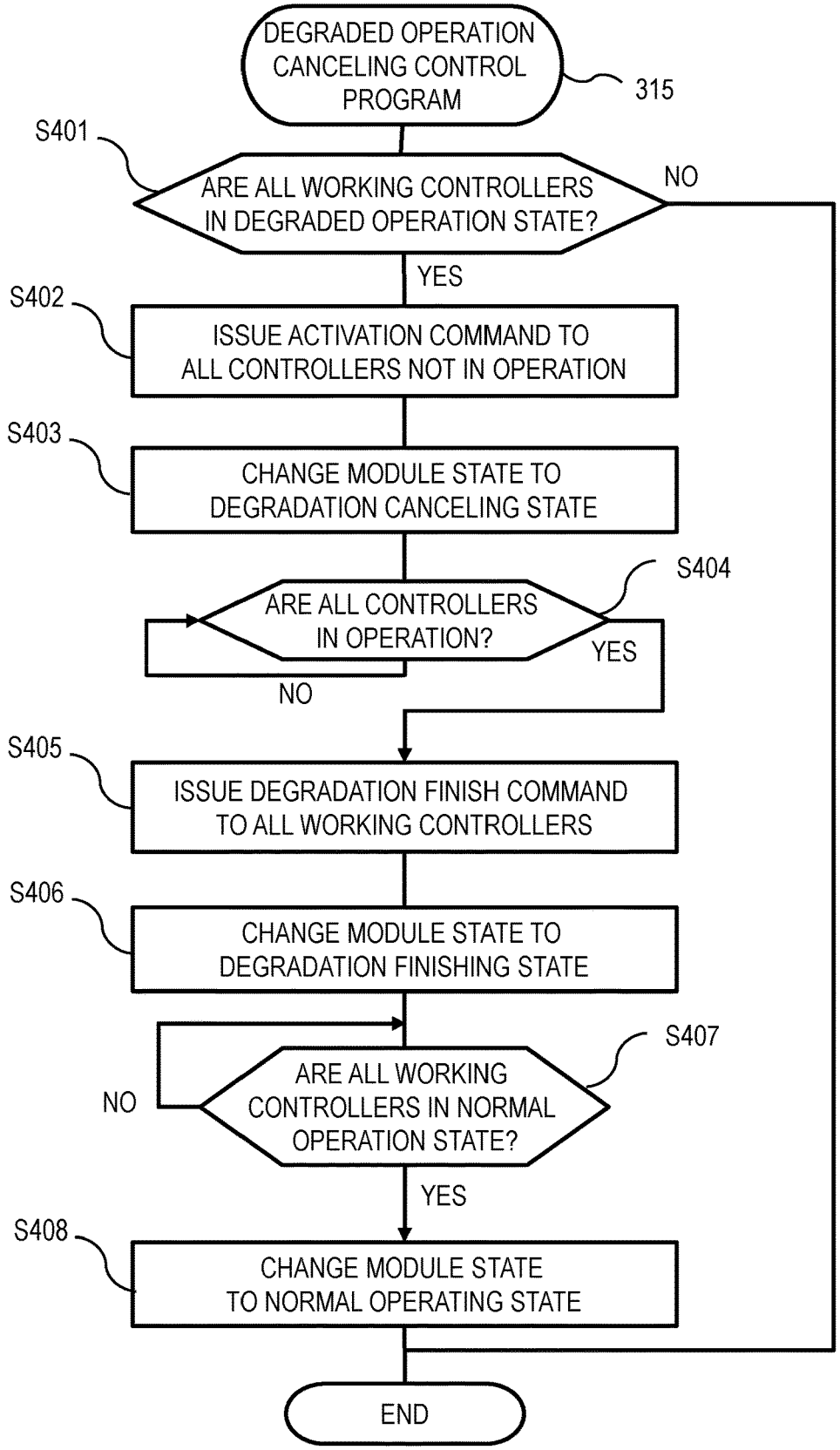
FIG. 11 is a flowchart of an example of the processing of a degraded operation canceling control program in the management apparatus.

FIG. 11 is a flowchart of an example of the processing of the degraded operation canceling control program 315 in the management apparatus 31. The degraded operation canceling control program 315 controls and manages cancellation of the degraded operation of a module 20 in response to a degraded operation cancel command from the user. In other words, the degraded operation canceling control program 315 controls and manages transition from the degraded operating state ST14 to the normal operating state ST11.

The degraded operation canceling control program 315 determines whether all controllers in operation are in a degraded operation state (S401). The degraded operation canceling control program 315 may acquire information on the controller states from the controllers 210 in operation or refer to the latest information on the controller states held in the management information.

Next, the degraded operation canceling control program 315 issues activation commands to the controllers 210 not in operation (S402). Next, the degraded operation canceling control program 315 changes the module state in the management information from degraded operating state ST14 to degradation canceling state ST16.

Next, the degraded operation canceling control program 315 determines whether all controllers are in operation (S404). The degraded operation canceling control program 315 waits for activation of all controllers 210 to which the activation commands are sent (S404: NO). If all controllers 210 are in operation (S404: YES), the degraded operation canceling control program 315 issues degradation finish commands to all the working controllers 210 (S405).

Next, the degraded operation canceling control program 315 changes the module state in the management information from degradation canceling state ST16 to degradation finishing state ST17 (S406). Next, the degraded operation canceling control program 315 determines whether all controllers 210 in operation are in a normal operation state based on the notifications about state change from all controllers 210 in operation (S407). The degraded operation canceling control program 315 waits for all the working controllers 210 to change into the normal operation state (S407: NO). If all the working controllers 210 are in a normal operation state (S407: YES), the degraded operation canceling control program 315 changes the module state in the management information from degradation finishing state ST17 to normal operating state ST11.

Figure 12:
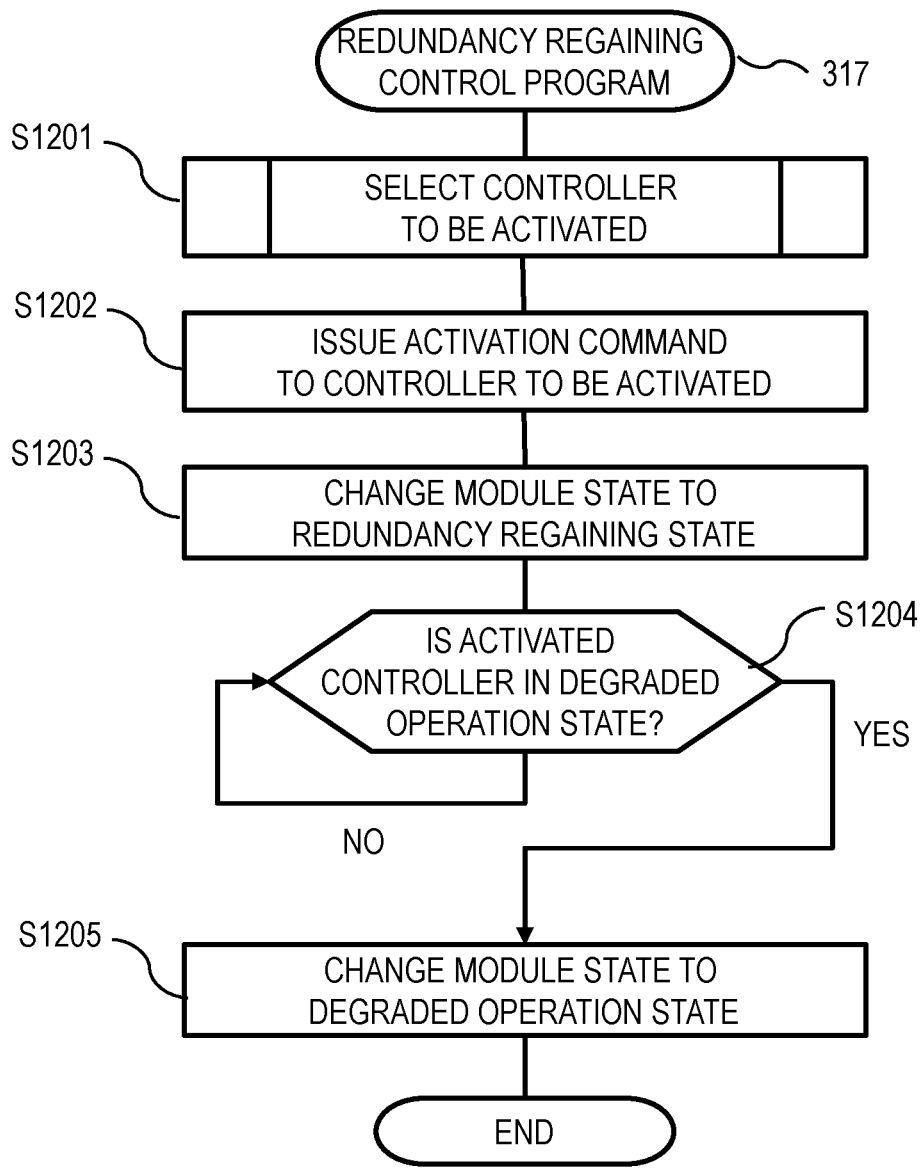
FIG. 12 is a flowchart of an example of the processing of a redundancy regaining control program in the management apparatus.

FIG. 12 is a flowchart of an example of the processing of the redundancy regaining control program 317 in the management apparatus 31. The redundancy regaining control program 317 controls and manages transition between the degraded operating state ST14 and the redundancy regaining state ST15. When a failure occurs in a controller 210 working under the degraded operation mode, a controller 210 not in operation is activated and replaced with the controller 210 that has stopped because of the failure to regain redundancy.

When a failure occurs in a module 20 in a degraded operating state ST14, the redundancy regaining control program 317 selects a controller 210 to be activated (S1201).

The controller to be activated can be selected as follows. In the case where a failure occurs in one controller 210 working under the first degraded operation mode (2N2C mode) 202A, a non-working controller 210 in the node 21 including the controller 210 with a failure is selected (2N2C mode). If the redundancy cannot be regained with the selected non-working controller 210, another non-working controller 210 in a node 21 different from the node including the controller 210 with a failure is selected (1N2C mode).

In the case where a failure occurs in one controller 210 working under the second degraded operation mode (1N2C mode) 202B, a non-working controller 210 in a node 21 different from the node 21 including the controller 210 with a failure (2N2C mode). If the redundancy cannot be regained with the selected non-working controller 210, another non-working controller 210 in a node 21 different from the node including the controller 210 with a failure is selected (2N2C mode).

Next, the redundancy regaining control program 317 issues an activation command to the controller to be activated (S1202). Next, the redundancy regaining control program 317 changes the module state in the management information from degraded operating state ST14 to redundancy regaining state ST15.

Next, the redundancy regaining control program 317 determines whether the activated controller is in a degraded operation state based on a notification about state change from the activated controller (S1204). The redundancy regaining control program 317 waits for the activated controller to change into the degraded operation state (S1204: NO). If the activated controller is in a degraded operation state (S1204: YES), the redundancy regaining control program 317 changes the module state in the management information from redundancy regaining state ST15 to degraded operating state ST14 (S1205).

Figure 13:
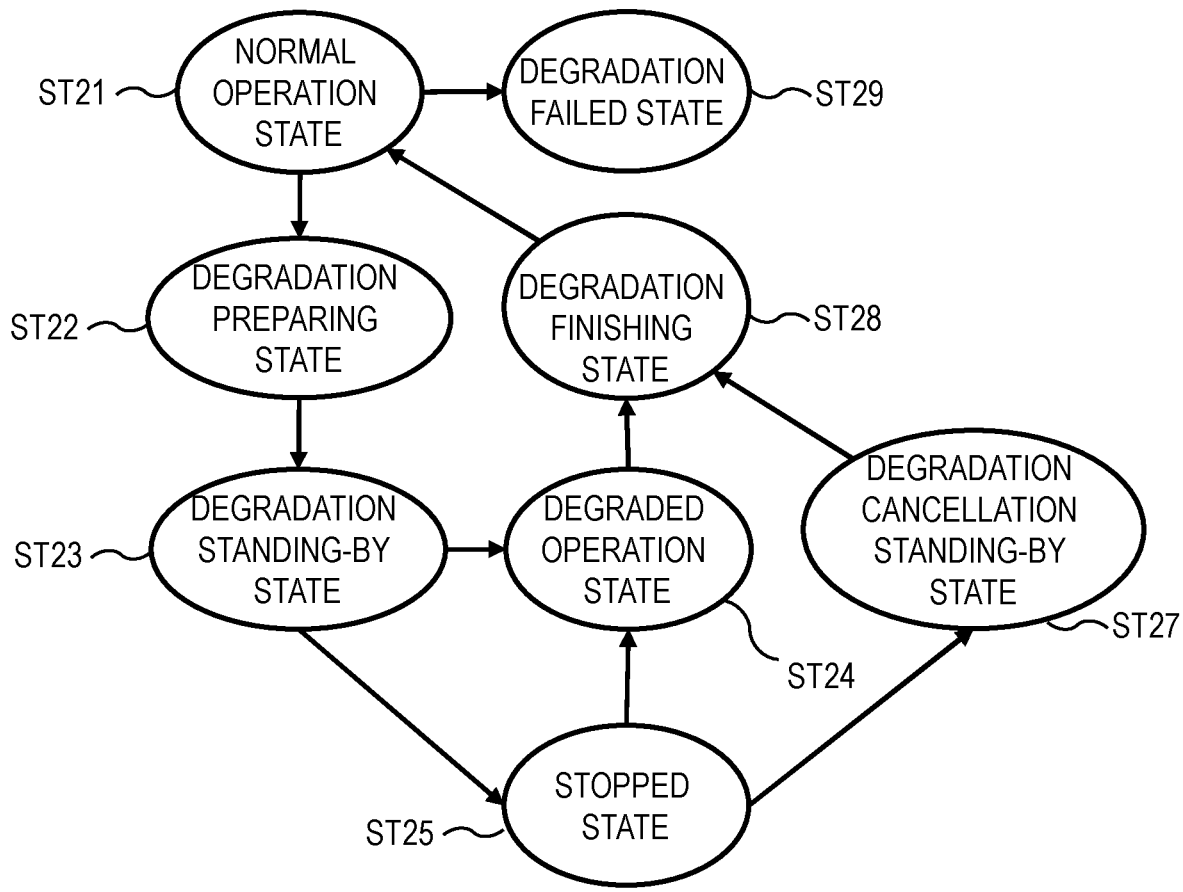
FIG. 13 illustrates state changes of a controller when the module state changes as described with reference to FIG. 9.

Hereinafter, the processing of a controller 210 along with state changes of a module 20 is described. FIG. 13 illustrates state changes of a controller when the module state changes as described with reference to FIG. 9.

When the module 20 is in the normal operating state ST11, the controllers 210 therein are in a normal operation state ST21. When the module 20 is in the degradation failed state ST18, one of the controllers 210 is in a degradation failed state ST29.

During transition of the module state from the normal operating state ST11 to the degraded operating state ST14, the state of each controller 210 going to stop changes from the normal operation state ST21 to a degradation preparing state ST22, a degradation standing-by state ST23, and a stopped state ST25 in this order. The state of each controller going to keep working changes from the normal operation state ST21 to a degradation preparing state ST22, a degradation standing-by state ST23, and a degraded operation state ST24 in this order.

During transition of the module state from the degraded operating state ST14 to the redundancy regaining state ST15, the controller state of the controller 210 that has received an activation command changes from a stopped state ST25 to a degraded operation state ST24.

During transition of the module state from the degraded operating state ST14 to the normal operating state ST11 in response to a command from the management apparatus 31, each controller 210 having been in operation changes from a degraded operation state ST24 into a normal operation state ST21 via a degradation finishing state ST28. Each controller having been stopped changes from a stopped state ST25 into a normal operation state ST21 via a degradation cancellation standing-by state ST27 and a degradation finishing state ST28.

Figure 14A:
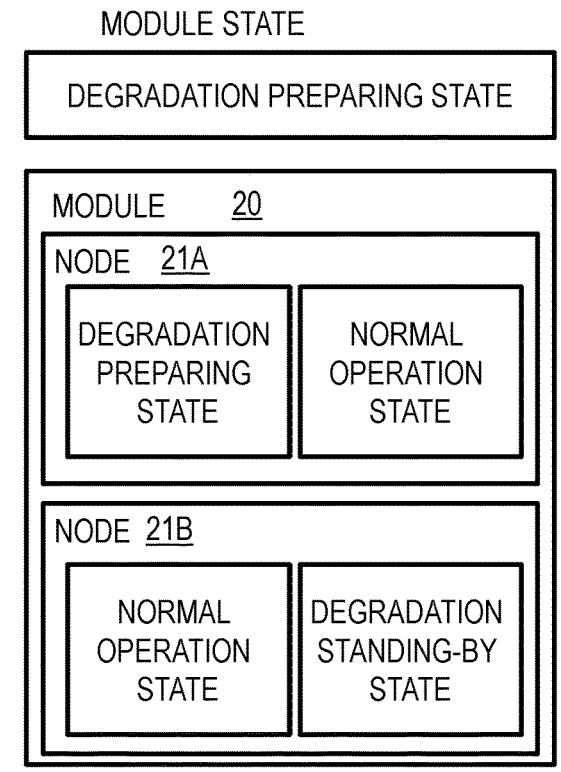
FIG. 14A illustrates an example of the combination of controller states when a module is in a degradation preparing state.
Figure 14B:
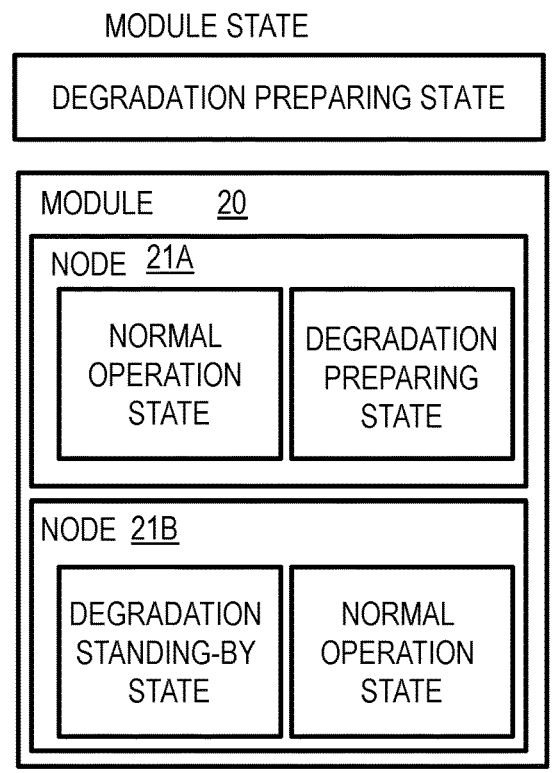
FIG. 14B illustrates another example of the combination of controller states when a module is in a degradation preparing state.

FIGS. 14A and 14B illustrate examples of the combination of controller states when a module 20 is in a degradation preparing state ST12. In the state of FIG. 14A, one of the controllers in the node 21A is in a degradation preparing state ST22 and the other controller is in a normal operation state ST21. One of the controllers in the node 21B is in a normal operation state ST21 and the other controller is in a degradation standing-by state ST23.

In the state of FIG. 14B, one of the controllers in the node 21A is in a normal operation state ST21 and the other controller is in a degradation preparing state ST22. One of the controllers in the node 21B is in a degradation standing-by state ST23 and the other controller is in a normal operation state ST21.

In the following, the processing of each controller 210 is described with reference to flowcharts. Each controller 210 manages its own state within the controller 210 and notifies the management apparatus 31 of the current state in response to a request from the management apparatus 31 or automatically.

Figure 15:
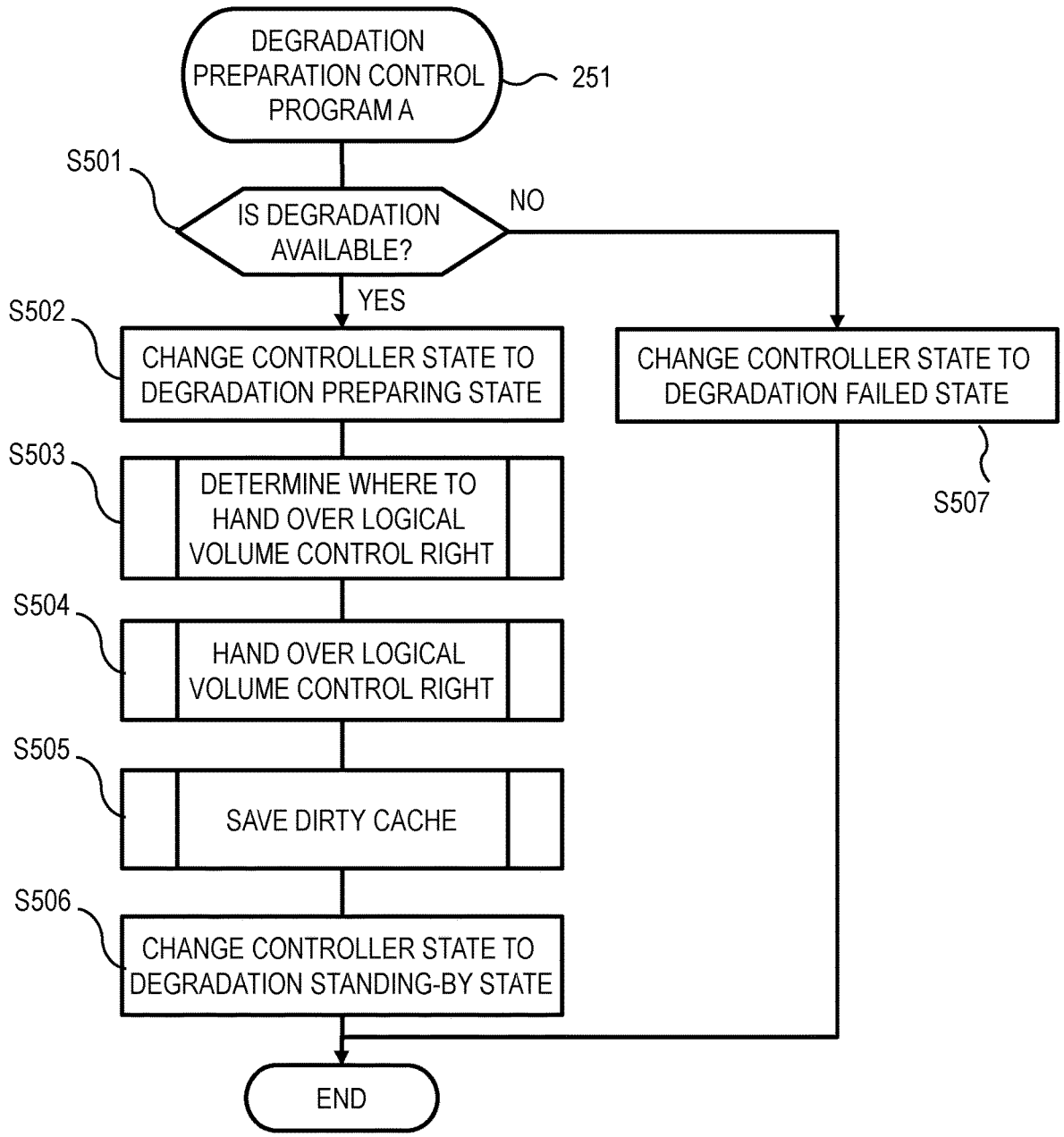
FIG. 15 is a flowchart of an example of the processing of a degradation preparation control program A in each controller.

FIG. 15 is a flowchart of an example of the processing of the degradation preparation control program A 251 in each controller 210. The degradation preparation control program A 251 is executed by each controller that is to be stopped when the module 20 is in a degraded operating state ST14. The degradation preparation control program A 251 changes the controller 210 from a normal operation state ST21 into a degradation failed state ST29 or a degradation preparing state ST22.

First, the degradation preparation control program A 251 determines whether the controller 210 is able to change into a degraded operation state based on predefined failure conditions (S501). An example of a failure condition with which the controller 210 is determined not to be able to change its state is that the controller 210 has a trouble in communication with other controllers 210. If the controller 210 is not able to change into a degraded operation state (S501: NO), the degradation preparation control program A 251 changes the state of the controller 210 to a degradation failed state (S507) and notifies the management apparatus 31 of the state change.

If the controller 210 does not satisfy any of the failure conditions and is able to change into a degraded operation state (S501: YES), the degradation preparation control program A 251 changes the controller state to a degradation preparing state (S502) and notifies the management apparatus 31 of the state change.

Next, the degradation preparation control program A 251 determines where to hand over the logical volume control right owned by the controller 210 (S503). The degradation preparation control program A 251 acquires information on the controllers 210 going to keep working from the management apparatus 31 or another controller 210 and selects the controller 210 where to hand over the logical volume control right. The selection policy is determined desirably; for example, a controller can be selected in accordance with designation by the user through the management apparatus 31 or to balance the loads of the controllers 210.

Next, the degradation preparation control program A 251 hands over the logical volume control right to the selected controller 210 (S504). Specifically, the controller 210 having the control right is switched by updating the control information 511.

Next, the degradation preparation control program A 251 saves the dirty cache (S505). Data saving destages the dirty cache to the drive box 40 or copies the dirty cache to another controller that is going to keep working. To be destaged is only the data for the logical volume for which the controller 210 has a control right. The other data is destaged by the other controller 210 in the pair achieving redundancy. Next, the degradation preparation control program A 251 changes the controller state to a degradation standing-by state (S506) and notifies the management apparatus 31 of the state change.

Figure 16:
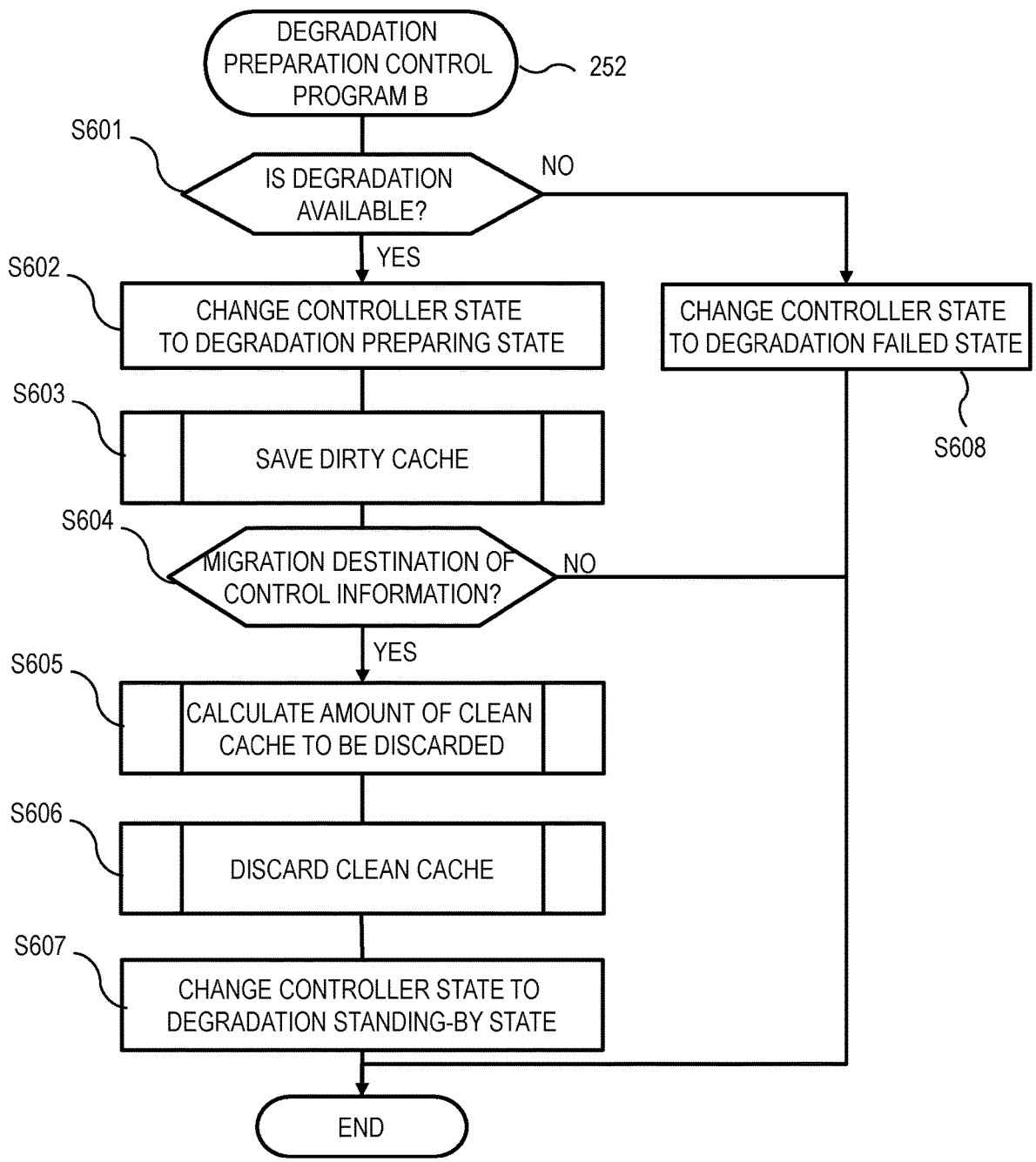
FIG. 16 is a flowchart of an example of the processing of a degradation preparation control program B in each controller.

FIG. 16 is a flowchart of an example of the processing of the degradation preparation control program B 252 in each controller 210. The degradation preparation control program B 252 is executed by each controller 210 that is going to keep working when the module 20 is in a degraded operating state ST14. The degradation preparation control program B 252 changes the controller 210 from a normal operation state ST21 into a degradation failed state ST29 or a degradation preparing state ST22.

First, the degradation preparation control program B 252 determines whether the controller 210 is able to change into a degraded operation state based on predefined failure conditions (S601). This step is the same as Step S501 in FIG. 15. If the controller 210 is not able to change into a degraded operation state (S601: NO), the degradation preparation control program B 252 changes the state of the controller 210 to a degradation failed state (S608) and notifies the management apparatus 31 of the state change. If the controller 210 is able to change into a degraded operation state (S601: YES), the degradation preparation control program B 252 changes the controller state to a degradation preparing state (S602) and notifies the management apparatus 31 of the state change.

Next, the degradation preparation control program B 252 saves the dirty cache (S603). In the case of destaging the dirty cache under the condition where the controller 210 having the other one of the redundant dirty cache pair is going to stop, the degradation preparation control program B 252 destages the data for the logical volume for which the controller 210 running the program 252 has the control right to the drive box 40. The degradation preparation control program B 252 also receives a copy of the necessary dirty cache from the controller 210 that is going to stop.

Next, the degradation preparation control program B 252 determines whether the controller 210 running it is a migration destination of the control information 511 of a controller 210 that is going to stop (S604). Where to migrate control information 511 is predetermined for each combination of controllers 210 that are going to stop and keep working; each controller 210 or the management apparatus 31 holds information about it. In the case where the management apparatus 31 holds the information, the management apparatus 31 designates the migration destination.

If the controller 210 is not a migration destination of control information 511 (S604: NO), this flow ends. If the controller 210 is a migration destination (S604: YES), the degradation preparation control program B 252 calculates the size of the memory area necessary to store the control information 511 to be received and calculates the amount of clean cache to be discarded in order to secure the necessary memory area (S605).

In addition to storing the control information 511, the clean cache can be discarded to save the dirty cache of another controller 210. On the premise of storing the dirty cache, the clean cache is discarded to secure the memory area necessary for the control information 511.

The degradation preparation control program B 252 discards (erases) the clean cache in the necessary amount to secure the necessary free area (S606). Next, the degradation preparation control program B 252 changes the controller state to a degradation standing-by state ST23 (S607) and notifies the management apparatus 31 of the state change.

Figure 17:
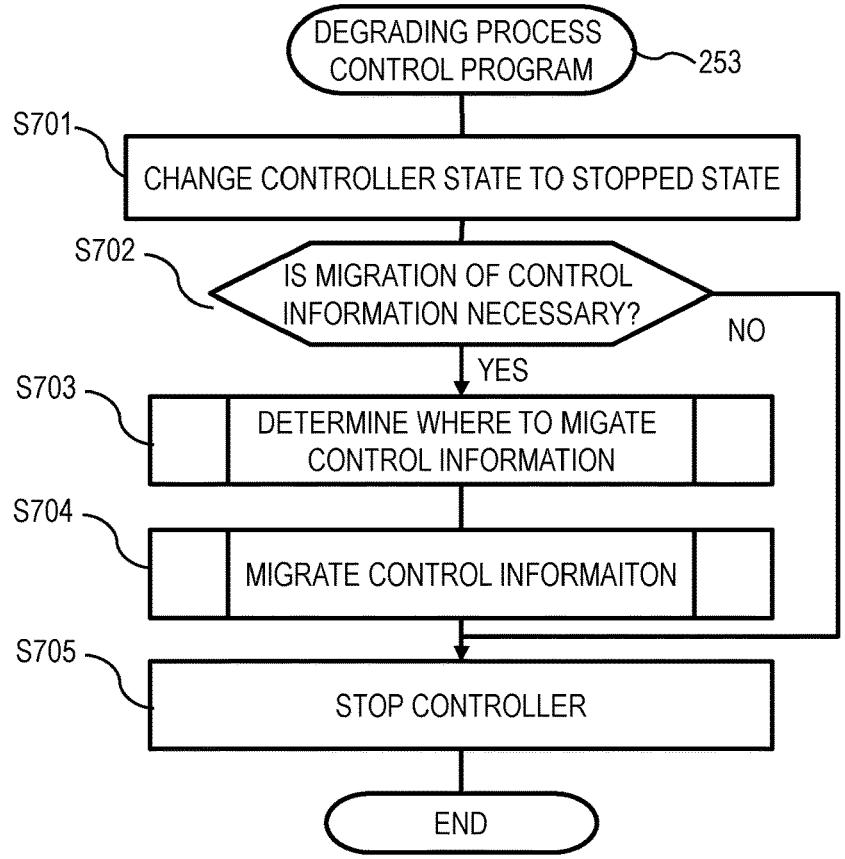
FIG. 17 is a flowchart of an example of the processing of a degrading process control program in each controller.

FIG. 17 is a flowchart of an example of the processing of the degrading process control program 253 in each controller 210. The degrading process control program 253 is executed by each controller going to stop. The degrading process control program 253 changes the state of the controller 210 from a degradation standing-by state ST23 into a stopped state ST25.

The degrading process control program 253 changes the controller state in the management information held by the controller 210 to stopped state (S701) and notifies the management apparatus 31 of the state change. Next, the degrading process control program 253 determines whether migration of control information 511 is necessary (S702). If the controller 210 holds and manages original control information 511, migration of the control information 511 is necessary.

If migration of control information 511 is necessary (S702: YES), the degrading process control program 253 determines where to migrate the control information 511 (S703). The degrading process control program 253 determines the destination in accordance with the designation by the management apparatus 31 or by selecting a controller predetermined for the combination of the controllers 210 going to keep working under the designated degraded operation mode. The degrading process control program 253 sends the control information 511 to the destination controller 210 (S704). Subsequently, the degrading process control program 253 shuts down the power of the controller 210 to stop the controller 210 (S705). If migration of control information 511 is not necessary, the degrading process control program 253 skips Steps S703 and S704. If all controllers 210 in a node 21 have stopped, the power controller (not shown) of the node 21 stops the peripheral devices such as the fan 230.

Figure 18:
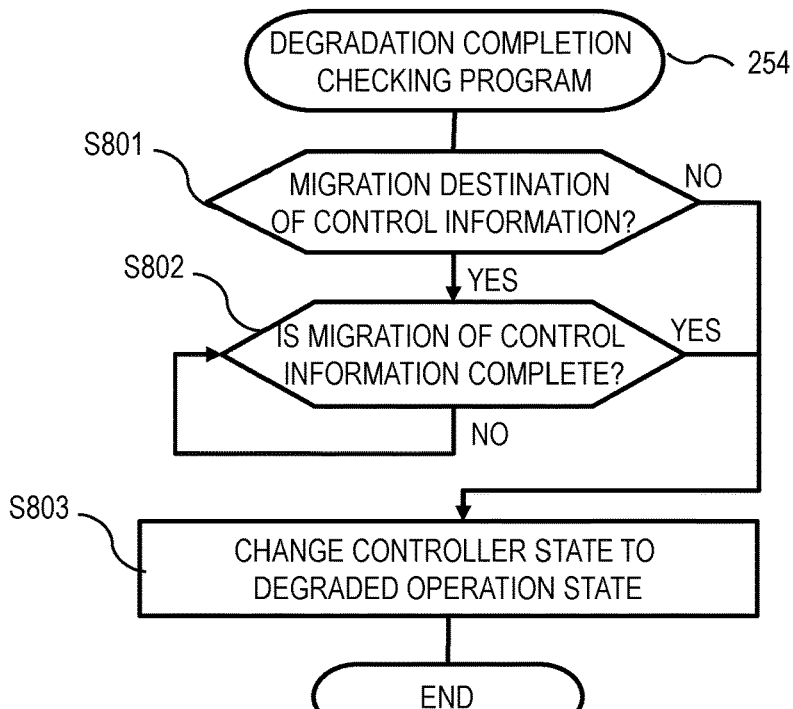
FIG. 18 is a flowchart of an example of the processing of a degradation completion checking program in each controller.

FIG. 18 is a flowchart of an example of the processing of the degradation completion checking program 254 in each controller 210. The degradation completion checking program 254 is executed by each controller going to keep working. The degradation completion checking program 254 changes the controller 210 from a degradation standing-by state ST23 into a degraded operation state ST24.

The degradation completion checking program 254 determines whether the controller 210 is a migration destination of control information (S801). The determination can be made as described at Step S703. If the controller 210 is a migration destination of control information (S801: YES), the degradation completion checking program 254 determines whether the migration of the control information has been completed (S802). The degradation completion checking program 254 waits for the migration to be completed (S802: NO).

If the migration is complete (S802: YES), the degradation completion checking program 254 changes the controller state in the management information to degraded operation state (S803) and notifies the management apparatus 31 of the state change into the degraded operation state. If the controller 210 is not a migration destination of control information (S801: NO), the degradation completion checking program 254 skips Step S802.

Figure 19:
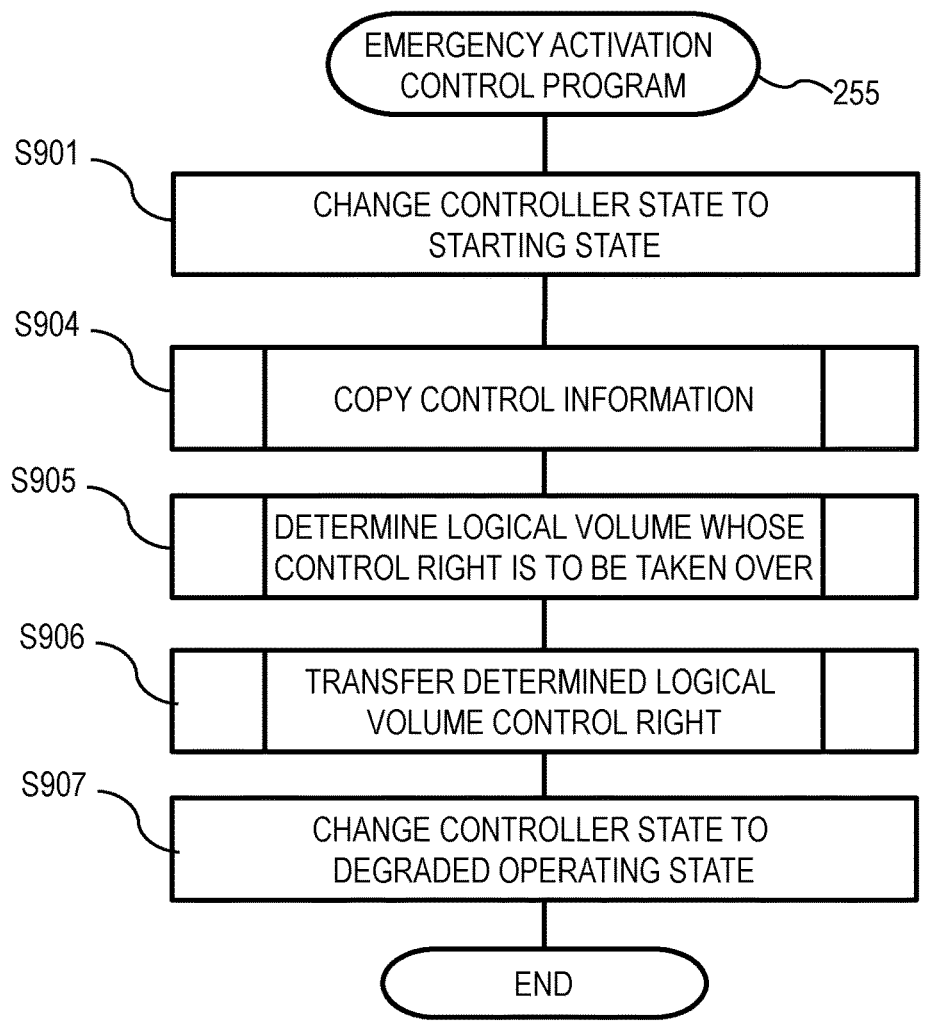
FIG. 19 is a flowchart of an example of the processing of an emergency activation control program in each controller.

FIG. 19 is a flowchart of an example of the processing of the emergency activation control program 255 in each controller 210. The emergency activation control program 255 starts in response to a command issued from the management apparatus 31 or another controller 210 when some controller working in the same module 20 in the degraded operation mode has stopped. The emergency activation control program 255 changes the controller 210 including the program 255 from a stopped state ST25 into a degraded operation state ST24. The emergency activation control program 255 performs processing to regain the redundancy of control information 511 and other necessary data.

The emergency activation control program 255 changes the controller state in the management information from stopped state ST25 to starting state (S901) and notifies the management apparatus 31 of the state change. Next, the emergency activation control program 255 duplicates the control information 511 (S902). Specifically, the emergency activation control program 255 takes a copy of the control information 511 from another controller 210 in operation. In addition to the control information 511, the dirty cache can also be duplicated.

Next, the emergency activation control program 255 determines the logical volume control right for the activated controller 210 to take over (S905). The information on assignment of control rights for the logical volumes is as described above. The emergency activation control program 255 transfers the control right for the determined logical volume to the activated controller 210 (S906). Specifically, information on the control rights in the control information 511 is updated. Next, the emergency activation control program 255 changes the controller state in the management information to degraded operation state ST24 (S907) and notifies the management apparatus 31 of the state change.

Figure 20:
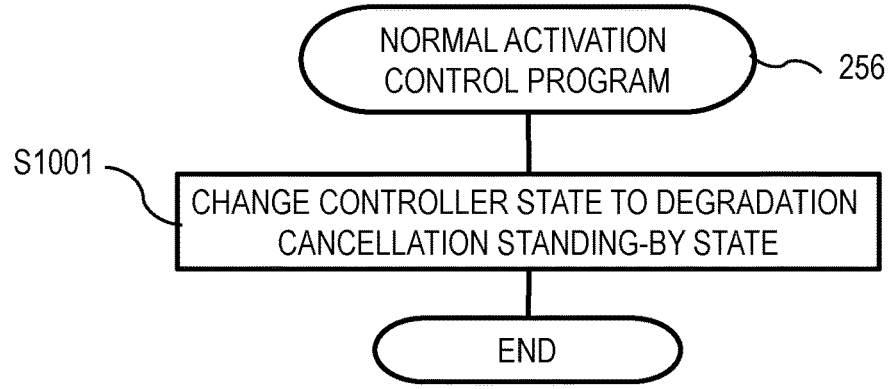
FIG. 20 is a flowchart of an example of the processing of a normal activation control program in each controller.

FIG. 20 is a flowchart of an example of the processing of the normal activation control program 256 in each controller 210. The normal activation control program 256 starts in response to a degraded operation cancel command from the management apparatus 31 under the normal conditions without a failure. The normal activation control program 256 changes the state of the controller 210 from a stopped state ST25 into a degradation cancellation standing-by state ST27.

The normal activation control program 256 changes the controller state in the management information from stopped state ST25 to degradation cancellation standing-by state ST27 (S1001) and notifies the management apparatus 31 of the state change.

Figure 21:
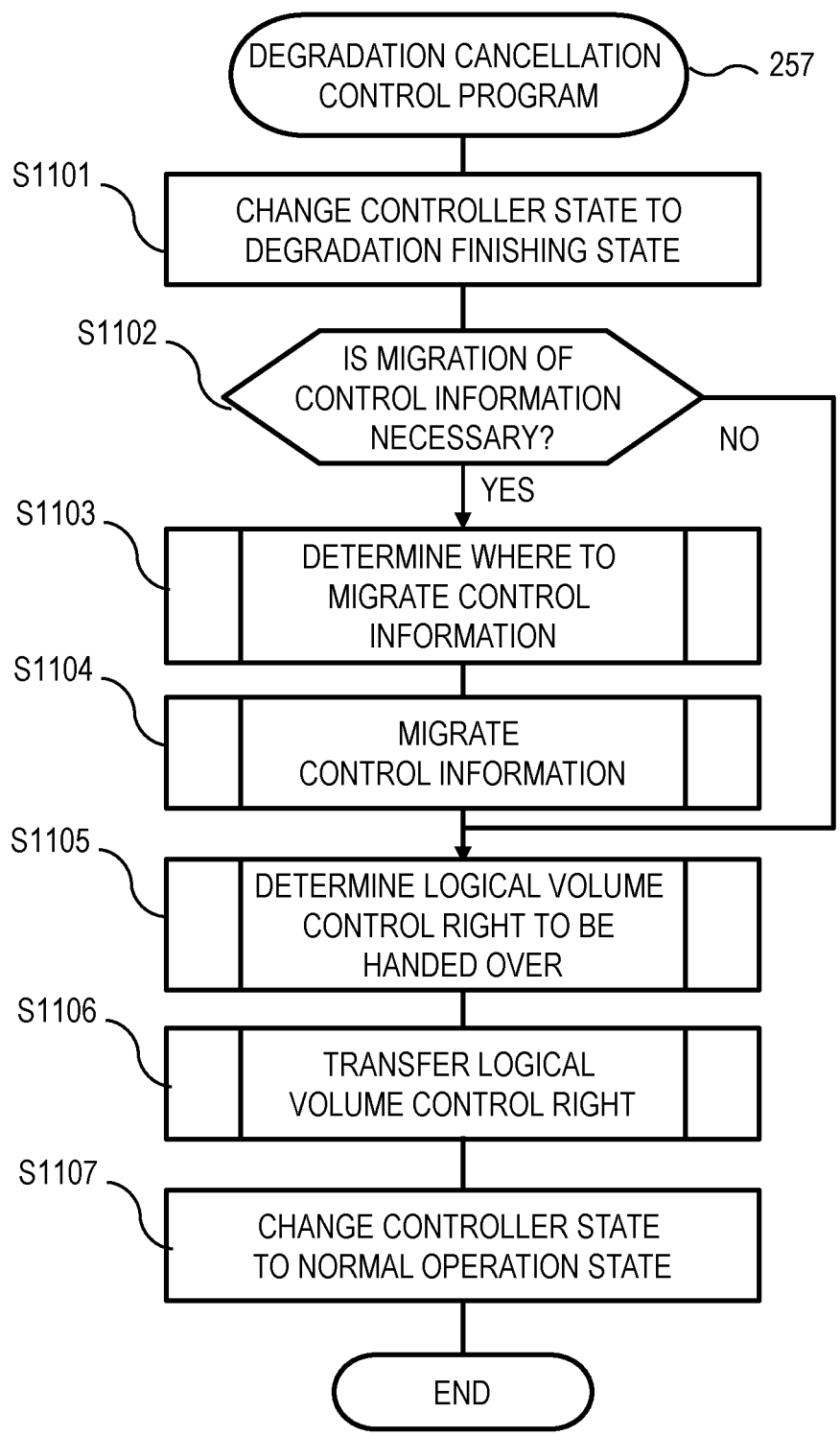
FIG. 21 is a flowchart of an example of the processing of a degradation cancellation control program in each controller.

FIG. 21 is a flowchart of an example of the processing of the degradation cancellation control program 257 in each controller 210. The degradation cancellation control program 257 is executed subsequent to the normal activation control program 256. The degradation cancellation control program 257 performs processing to cancel the degraded operating state of a module 20. The module 20 changes into the normal operating state ST11 and all the four controllers 210 therein get in operation.

The degradation cancellation control program 257 is executed in each controller 210 in a degraded operation state ST24 and each controller whose state has been changed from a stopped state ST25 to a degradation cancellation standing-by state ST27 by the normal activation control program 256.

The degradation cancellation control program 257 starts in response to a command from the management apparatus 31. The degradation cancellation control program 257 changes the controller 210 from a degraded operation state ST24 or a degradation cancellation standing-by state ST27 into a normal operation state ST21 via a degradation finishing state ST28.

The degradation cancellation control program 257 changes its controller state in the management information to degraded operation finishing state (S1101) and notifies the management apparatus 31 of the state change. Next, the degradation cancellation control program 257 determines whether migration of the control information or sending the control information 511 to another controller is necessary (S1102). The controller 210 that should hold and manage the control information 511 when the module 20 is in the normal operating state ST11 is predetermined; the information about it is provided by the management apparatus 31 or held in each controller 210.

If the migration is necessary (S1102: YES), the degradation cancellation control program 257 determines where to migrate the control information as described above (S1103). The degradation cancellation control program 257 performs migration of the control information (S1104). If the migration is not necessary (S1102: NO), the degradation cancellation control program 257 skips Steps S1103 and S1104.

Next, the degradation cancellation control program 257 determines logical volume control rights to be handed over, if the controller 210 has logical volume control rights (S1105). The controller 210 where to hand over a logical volume control right can be determined as described above. The degradation cancellation control program 257 performs necessary transfer of logical volume control rights (S1106). Next, degradation cancellation control program 257 changes the controller state in the management information to normal operation state (S1107) and notifies the management apparatus 31 of the state change.

It should be noted that this invention is not limited to the above-described embodiments but include various modifications. For example, the above-described embodiments provide details for the sake of better understanding of this invention; they are not limited to those including all the configurations as described. A part of the configuration of an embodiment may be replaced with a configuration of another embodiment or a configuration of an embodiment may be incorporated into a configuration of another embodiment. A part of the configuration of an embodiment may be added, deleted, or replaced by that of a different configuration.

The above-described configurations, functions, and processing units, for all or a part of them, may be implemented by hardware: for example, by designing an integrated circuit. The above-described configurations and functions may be implemented by software, which means that a processor interprets and executes programs providing the functions. The information of programs, tables, and files to implement the functions can be stored in a storage device such as a memory, a hard disk drive, or an SSD (Solid State Drive), or a storage medium such as an IC card or an SD card.

The drawings show control lines and information lines as considered necessary for explanations but do not show all control lines or information lines in the products. It can be considered that most of all components are actually interconnected.

What is claimed is:

1. A storage system comprising a plurality of storage controllers,
    wherein the plurality of storage controllers shift from a normal operation mode to a degraded operation mode in accordance with a command from a management apparatus,
    wherein each of the plurality of storage controllers changes from state to state among a plurality of states,
    wherein the plurality of states include:
        a normal operation state in which the storage controller controls data input and output between one or more host apparatuses and one or more storage drives under the normal operation mode;
        a degraded operation state in which the storage controller controls data input and output between one or more host apparatuses and one or more storage drives under the degraded operation mode; and
        a standing-by state in which the storage controller stops data input and output between a host apparatus and a storage drive, consuming less power than in the normal operation state or the degraded operation state,
    wherein each of the plurality of storage controllers in the normal operation mode works in the normal operation state,
    wherein, in transition from the normal operation mode to the degraded operation mode in accordance with a command from the management apparatus, a storage controller designated by the management apparatus out of the plurality of storage controllers changes from the normal operation state into the standing-by state and the other storage controllers except for the designated storage controller change from the normal operation state into the degraded operation state,
    wherein the storage controller in the standing-by state changes into the degraded operation state in response to stop of a storage controller in the degraded operation state because of occurrence of a failure under the degraded operation mode,
    wherein the plurality of storage controllers are included in a module,
    wherein the number of storage controllers included in the module is four,
    wherein the module includes a first node and a second node,
    wherein two of the four storage controllers are included in the first node and the other two of the four storage controllers are included in the second node, and
    wherein the four storage controllers are able to control data input and output between a common host apparatus and a common storage drive in the normal operation state and the degraded operation state.

2. The storage system according to claim 1, wherein, in the degraded operation mode, a storage controller in the degraded operation state has host paths with all host apparatuses with which the plurality of storage controllers communicate via a host path in the normal operation mode and drive paths with all storage drives with which the plurality of storage controllers communicate via a drive path in the normal operation mode.

3. The storage system according to claim 1,
    wherein each of the first node and the second node includes a component shared by the two storage controllers in the node,
    wherein the standing-by state is a stopped state in which power supply is stopped, and
    wherein each of the first node and the second node stops the component when the two storage controllers in the node are in the stopped state.

4. The storage system according to claim 1,
    wherein the degraded operation mode is one of a first degraded operation mode and a second degraded operation mode,
    wherein the first degraded operation mode is a mode in which one storage controller in the first node is in the standing-by state, the other one storage controller in the first node is in the degraded operation state, one storage controller in the second node is in the standing-by state, and the other one storage controller in the second node is in the degraded operation state, and
    wherein the second degraded operation mode is a mode in which the two storage controllers in the first node are in the standing-by state and the two storage controllers in the second node are in the degraded operation state.

5. The storage system according to claim 1,
wherein the storage system manages one or more logical volumes,
wherein control rights for the one or more logical volumes are assigned to one or more responsible controllers in the plurality of controllers,
wherein data input and output for a logical volume is exclusively controlled by a responsible storage controller assigned a control right for the logical volume, and
wherein, when a responsible storage controller changes into the standing-by state in the degraded operation mode, the assigned control right is handed over to a storage controller in the degraded operation state.

6. The storage system according to claim 1,
wherein, in the normal operation mode, one or more of the plurality of storage controllers hold and manage control information of the storage system and each of the other storage controllers acquires the control information from one of the one or more storage controllers, and
wherein, when one of the one or more storage controllers changes into the standing-by state in the degraded operation mode, the control information in the one storage controller is migrated to a storage controller in the degraded operation state.

7. The storage system according to claim 6, wherein, in a case where a memory of the storage controller to receive the control information does not have a free area enough to store the control information, the storage controller discards clean cache in the memory to secure an area for storing the control information.

8. The storage system according to claim 1, wherein dirty cache held by the storage controller going to change into the standing-by state in the degraded operation mode is destaged to a storage drive or migrated to a storage controller in the degraded operation state.

9. A method of controlling a storage system including a plurality of storage controllers,
the plurality of storage controllers being configured to shift from a normal operation mode to a degraded operation mode in accordance with a command from a management apparatus,
each of the plurality of storage controllers being configured to change from state to state among a plurality of states, the plurality of states including:
a normal operation state in which the storage controller controls data input and output between one or more host apparatuses and one or more storage drives under the normal operation mode;
a degraded operation state in which the storage controller controls data input and output between one or more host apparatuses and one or more storage drives under the degraded operation mode; and
a standing-by state in which the storage controller stops data input and output between a host apparatus and a storage drives, consuming less power than in the normal operation state or the degraded operation state, and
the method comprising:
making, in the normal operation mode, each of the plurality of storage controllers work in the normal operation state:
making, in transition from the normal operation mode to the degraded operation mode in accordance with a command from the management apparatus, a storage controller designated by the management apparatus out of the plurality of storage controllers change from the normal operation state into the standing-by state and the other storage controllers except for the designated storage controller change from the normal operation state into the degraded operation state; and
making the storage controller in the standing-by state change into the degraded operation state in response to stop of a storage controller in the degraded operation state because of occurrence of a failure under the degraded operation mode,
wherein the plurality of storage controllers are included in a module,
wherein the number of storage controllers included in the module is four,
wherein the module includes a first node and a second node,
wherein two of the four storage controllers are included in the first node and the other two of the four storage controllers are included in the second node, and
wherein the four storage controllers are able to control data input and output between a common host apparatus and a common storage drive in the normal operation state and the degraded operation state.

* * * * *